(12) United States Patent
Nakamura

(10) Patent No.: US 11,644,808 B2
(45) Date of Patent: *May 9, 2023

(54) PROGRAMABLE LOGIC CONTROLLER

(71) Applicant: Keyence Corporation, Osaka (JP)

(72) Inventor: Tatsuya Nakamura, Osaka (JP)

(73) Assignee: KEYENCE CORPORATION, Osaka (JP)

(*) Notice: Subject to any disclaimer, the term of this patent is extended or adjusted under 35 U.S.C. 154(b) by 294 days.

This patent is subject to a terminal disclaimer.

(21) Appl. No.: 17/012,112

(22) Filed: Sep. 4, 2020

(65) Prior Publication Data

US 2021/0103264 A1  Apr. 8, 2021

(30) Foreign Application Priority Data

Oct. 3, 2019 (JP) .............................. JP2019-183256
Jun. 29, 2020 (JP) .............................. JP2020-111878

(51) Int. Cl.
G05B 19/05 (2006.01)
G06F 13/36 (2006.01)

(52) U.S. Cl.
CPC ............ *G05B 19/05* (2013.01); *G06F 13/36* (2013.01); *G05B 2219/1131* (2013.01)

(58) Field of Classification Search
CPC ................................ G05B 19/05; G05F 13/36
USPC ............................................................ 700/28
See application file for complete search history.

(56) References Cited

U.S. PATENT DOCUMENTS

| 10,678,225 | B2* | 6/2020 | Kidd | G05B 19/41875 |
| 2013/0212420 | A1* | 8/2013 | Lawson | G06N 7/005 |
| | | | | 713/400 |
| 2016/0266563 | A1* | 9/2016 | Mizutani | G05B 19/0421 |
| 2017/0068229 | A1* | 3/2017 | Yaoita | G06F 11/32 |
| 2017/0300753 | A1* | 10/2017 | Billi | H04N 5/765 |
| 2018/0285398 | A1* | 10/2018 | Nishiyama | G06F 16/2228 |
| 2019/0018385 | A1 | 1/2019 | Soneda et al. | |
| 2019/0294137 | A1* | 9/2019 | Kawanoue | G05B 23/024 |
| 2020/0125060 | A1 | 4/2020 | Fujimura | |
| 2020/0125061 | A1 | 4/2020 | Miyasaka | |
| 2020/0201279 | A1* | 6/2020 | Toku | G06F 9/541 |
| 2020/0259998 | A1 | 8/2020 | Tsujikawa | |
| 2020/0310733 | A1 | 10/2020 | Fujimura et al. | |

FOREIGN PATENT DOCUMENTS

JP  5661222 B1  1/2015
JP  201897662 A  6/2018

OTHER PUBLICATIONS

U.S. Appl. No. 17/012,104, filed Sep. 4, 2020 (125 pages).

* cited by examiner

*Primary Examiner* — Md Azad

(74) *Attorney, Agent, or Firm* — Kilyk & Bowersox, P.L.L.C.

(57) ABSTRACT

To efficiently collect and transfer monitoring target data in a PLC. The PLC includes a first execution engine, a holding section, and a second execution engine. Further, the PLC collects data stored in a collection target holding section according to predetermined collection setting, accumulates collected time-series data in a first buffer, and transfers the time-series data stored in the first buffer to the second execution engine via a bus. The second execution performs data processing of the transferred time series data, generates display data to be displayed on a dashboard, and provides the display data to an external computer.

20 Claims, 20 Drawing Sheets

| COLLECTION COUNT | TIMER | Dev0 | Dev1 | Dev10 |
|---|---|---|---|---|
| 511 | 43252 | 0x0016 | 0x0010 | 0x0012 |
| 512 | 43350 | 0x0013 | 0x0010 | 0x001F |
| 513 | 43460 | 0x0015 | 0x0010 | 0x0025 |
| 514 | 43555 | 0x0011 | 0x0010 | 0x002E |
| 515 | 43653 | 0x0018 | 0x0010 | 0x0034 |

| COLLECTION COUNT | TIMER | IDENTIFICATION INFORMATION | Dev1 | Dev10 | Dev11 |
|---|---|---|---|---|---|
| 511 | 43252 | 1 | 0x0010 | 0x0012 | - |
| 512 | 43350 | 1 | 0x0010 | 0x001F | - |
| 513 | 43460 | 2 | 0x0010 | 0x0025 | 0x0025 |
| 514 | 43555 | 2 | 0x0010 | 0x002E | 0x002E |
| 515 | 43653 | 2 | 0x0010 | 0x0034 | 0x0034 |

FIG. 22

| SCAN NUMBER | TIMER | IDENTIFICATION FLAG | COLLECTION TARGET 1 | COLLECTION TARGET 2 | COLLECTION TARGET 3 | MR001 | MR002 | MR003 | MR004 |
|---|---|---|---|---|---|---|---|---|---|
| 95 | 43252 | 5 | OFF | OFF | OFF | OFF | OFF | ON | OFF |
| 96 | 43350 | 5 | ON | OFF | OFF | ON | OFF | ON | ON |
| 97 | 43460 | 5 | ON | OFF | OFF | ON | OFF | OFF | ON |
| 98 | 43555 | 5 | OFF | ON | OFF | OFF | ON | OFF | ON |
| 99 | 43653 | 5 | OFF | ON | OFF | OFF | ON | ON | ON |
| 100 | 43756 | 5 | OFF | OFF | OFF | OFF | ON | OFF | ON |
| 101 | 43857 | 6 | OFF | OFF | ON | ON | ON | OFF | OFF |
| 102 | 43958 | 6 | ON | OFF | ON | ON | ON | OFF | ON |
| 103 | 44058 | 6 | ON | OFF | ON | OFF | OFF | OFF | ON |
| 104 | 44159 | 6 | OFF | OFF | ON | OFF | ON | OFF | ON |
| 105 | 44260 | 6 | OFF | OFF | ON | OFF | ON | ON | ON |
| 106 | 44360 | 6 | OFF | ON | ON | OFF | ON | ON | ON |

PROGRAMABLE LOGIC CONTROLLER

CROSS-REFERENCE TO RELATED APPLICATIONS

The present application claims foreign priority based on Japanese Patent Application No. 2019-183256, filed Oct. 3, 2019, and No. 2020-111878, filed Jun. 29, 2020, the contents of which are incorporated herein by references.

BACKGROUND OF THE INVENTION

1. Field of the Invention

The present invention relates to a programmable logic controller.

2. Description of Related Art

A programmable logic controller (PLC) is a controller that controls industrial machines such as a manufacturing apparatus, a conveyance apparatus, and an inspection apparatus in factory automation (Japanese Patent No. 5661222 (Patent Literature 1) and JP-A-2018-097662 (Patent Literature 2)).

The PLC executes a user program such as a ladder program created by a programmer to control various extension units and controlled apparatuses.

Incidentally, in order to monitor the operation of the PLC and the operation of the industrial machines controlled by the PLC, it is desired to collect and utilize data held by the PLC. The PLC includes a basic unit (a CPU unit) and extension units connected to the basic unit. The basic unit executes a user program such as a ladder program to control the extension units. The extension units control the industrial machines according to a command from the basic unit and returns a control result to the basic unit. In order to reduce a load on the basic unit, the inventors conceived of connecting a data utilization unit to the basic unit as one of the extension units. However, since a control period of the extension units and a control period of the basic unit (a scan period of the user program) are different, various problems occur. For example, when the extension units collect a device value from a device memory of the basic unit according to the control period of the extension units, the extension units would fail to take data refreshed at every scan period of the basic unit. That is, the extension unit can collect only one device value at every plurality of scan periods. On the other hand, when the basic unit collects and transfers a device value in an end processing period at the end of the scan period, the basic unit cannot shift to the next scan period unless the collection and the transfer of the device value are completed. That is, the scan period is extended and work efficiency of the industrial machines is deteriorated.

SUMMARY OF THE INVENTION

Therefore, an object of the present invention is to efficiently collect and transfer monitoring target data in a PLC.

The present invention provides, for example, a programmable logic controller including: a first execution engine configured to repeatedly execute a first user program; a plurality of holding sections, which are devices or variables configured to store data accessed by the first execution engine according to the first user program; a second execution engine configured to execute a second user program asynchronous with a scan period of the first user program; a bus configured to connect the first execution engine and the second execution engine; a collecting section configured to collect, at every scan period of the first user program, according to predetermined collection setting, data stored in a collection target holding section among the plurality of holding sections; a first buffer configured to accumulate time-series data collected at the every scan period by the collecting section; and a transferring section configured to transfer the time-series data stored in the first buffer to the second execution engine via the bus. The second execution engine includes: a processing section configured to perform, according to predetermined processing setting, data processing of the time-series data transferred by the transferring section; a generating section configured to generate display data for displaying a processing result of the data processing on a dashboard; and a providing section configured to provide the display data to an external computer.

According to the present invention, it is possible to efficiently collect and transfer monitoring target data in a PLC.

BRIEF DESCRIPTION OF THE DRAWINGS

FIG. 22 is a diagram showing collected data during a dynamic change of the monitoring target.

DESCRIPTION OF EMBODIMENTS

Figure 1:
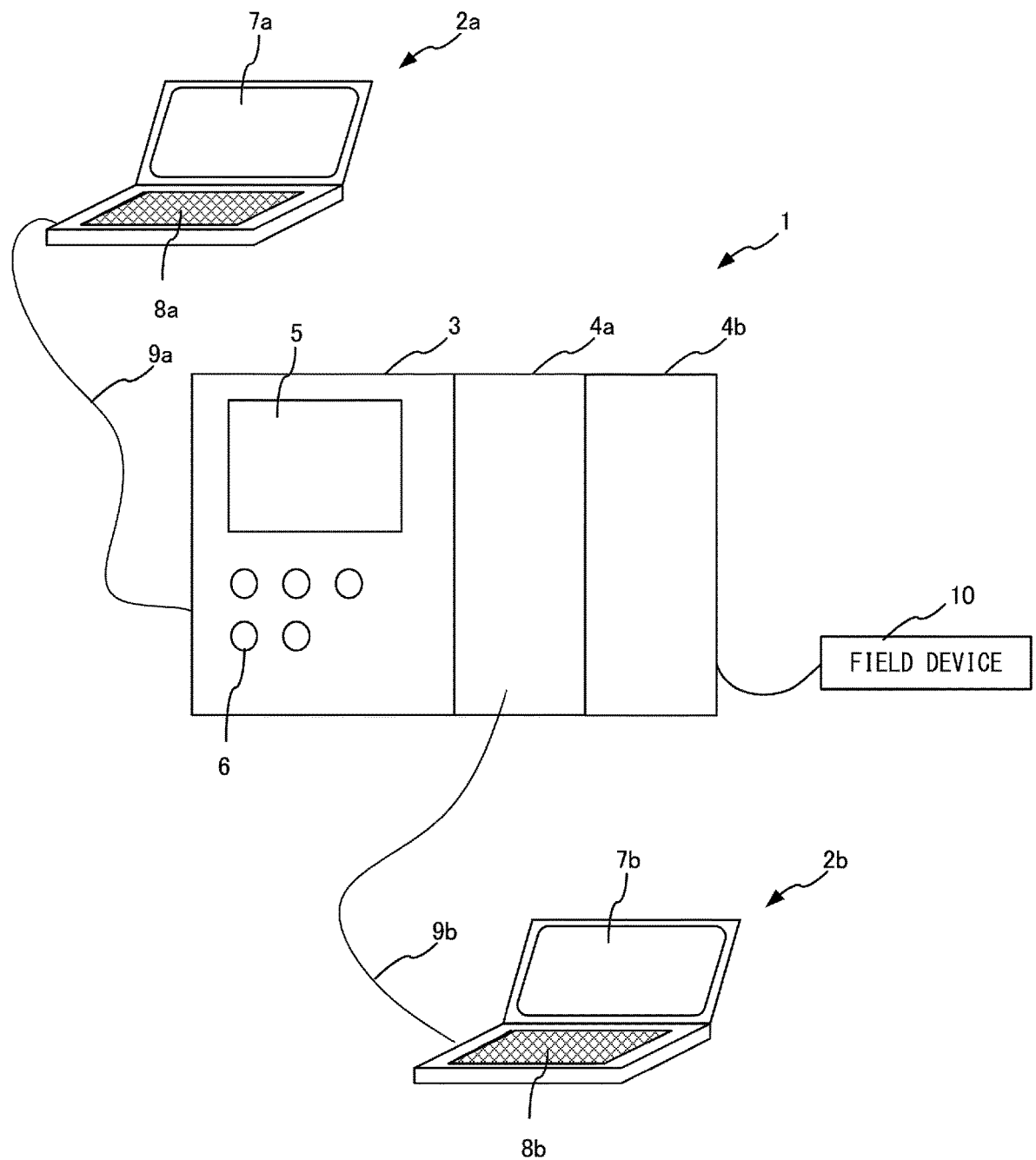
FIG. 1 is a diagram showing a PLC system.

The basic unit 3 includes a display section 5 and an operation section 6. The display section 5 can display operation states and the like of the extension units 4 attached to the basic unit 3. The display section 5 switches display content according to operation content of the operation section 6. The display section 5 usually displays a present value (a device value) of a device in the PLC 1, information concerning an error that occurs in the PLC 1, and the like. The device is a name indicating a region on a memory provided to store the device value (device data) and may be called device memory as well. The device value is information indicating an input state from an input device, an output state to an output device, and states of an internal relay (an auxiliary relay), a timer, a counter, a data memory, and the like set on a user program. Types of the device value include a bit type and a word type. A bit device stores a one-bit device value. A word device stores a one-word device value. As a collection target of a data utilization program explained in detail below, not only a device but also a variable may be designated. However, both of the device and the variable are holding means for holding information. Therefore, in the following explanation, the device indicates the variable as well. A memory that holds the device may be called device memory. A memory that holds collected data may be called data memory.

An extension unit 4a is a data collection unit that collects collection target data from the basic unit 3 and the extension unit 4b, executes a user program (a data utilization program) such as a flow to apply data processing to the collection target data and create display target data, and creates display data (source data) for displaying a dashboard on a display section 7 or a PC 2. A flow (a flow program) explained below is only an example of the data utilization program. The basic unit 3 is sometimes called CPU unit as well. Note that the system including the PLC 1 and the PC 2 may be called programmable logic controller system.

A PC 2a is a computer mainly operated by a programmer. On the other hand, a PC 2b is a computer mainly operated by a person in charge of site management. The PC 2a may be called program creation supporting device (setting device) as well. A PC 2 is, for example, a portable notebook or tablet personal computer or a smartphone and is an external computer including the display section 7 and an operation section 8. The external computer is a computer present on the outside of the PLC 1. A ladder program, which is an example of a user program for controlling the PLC 1, is created using the PC 2a. The created ladder program is converted into a mnemonic code in the PC 2a. The PC 2 is connected to the basic unit 3 of the PLC 1 via a communication cable 9 such as a USB (Universal Serial Bus) cable. For example, the PC 2a sends the ladder program converted into the mnemonic code to the basic unit 3. The basic unit 3 converts the ladder program into a machine code and stores the machine code in a memory included in the basic unit 3. Note that, although the mnemonic code is transmitted to the basic unit 3, the present invention is not limited to this. For example, the PC 2a may convert the mnemonic code into an intermediate code and transmit the intermediate code to the basic unit 3.

Program Creation Supporting Device

Figure 2:
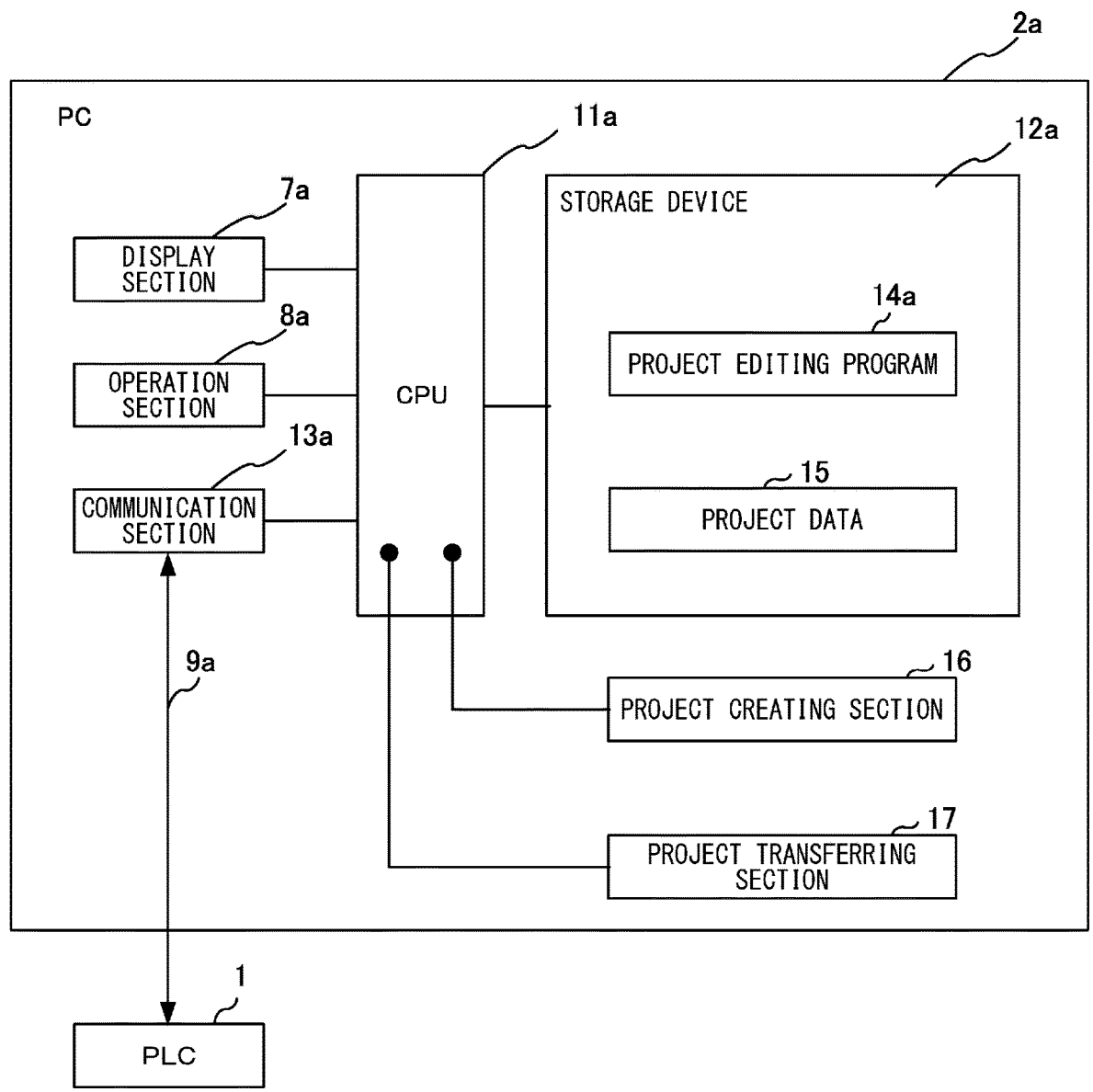
FIG. 2 is a diagram for explaining a PC.

FIG. 2 is a block diagram for explaining an electric configuration of the PC 2a. As shown in FIG. 2, the PC 2a includes a CPU 11a, a display section 7a, an operation section 8a, a storage device 12a, and a communication section 13a. The display section 7a, the operation section 8a, the storage device 12a, and the communication section 13a are respectively electrically connected to the CPU 11a. The storage device 12a includes a RAM, a ROM, a HDD, and an SSD and may further include a detachable memory card. The CPU is an abbreviation of central processing unit. The ROM is an abbreviation of read only memory. The RAM is an abbreviation of random access memory. The HDD is an abbreviation of hard disk drive. The SSD is an abbreviation of solid-state drive.

A user of the PC 2a causes the CPU 11a to execute a project editing program 14a stored in the storage device 12a and edits project data 15 through the operation section 8a. The CPU 11a executes the project editing program 14a, whereby the project creating section 16 and the project transferring section 17 are realized. The project creating section 16 creates the project data 15 according to a user input. The project transferring section 17 transfers the project data 15 to the PLC 1. The project data 15 includes one or more user programs (for example, a ladder program) and configuration information of the basic unit 3 and the extension units 4. The configuration information is information indicating connecting positions of the plurality of extension units 4 to the basic unit 3 and functions (for example, a communication function and a positioning function) of the basic unit 3 and information indicating functions (for example, a photographing function) of the extension units 4 and the like. The editing of the project data 15 includes creation and change (reediting) of the project data 15. The user can read out the project data 15 stored in the storage device 12a and change the project data 15 using the project editing program 14a according to necessity. The communication section 13a communicates with the basic unit 3 via a communication cable 9a. The project transferring section 17 transfers the project data to the basic unit 3 via the communication section 13a. The communication section 13a communicates with the extension unit 4a via a communication cable 9b.

PC Used for Display of a Dashboard

Figure 3:
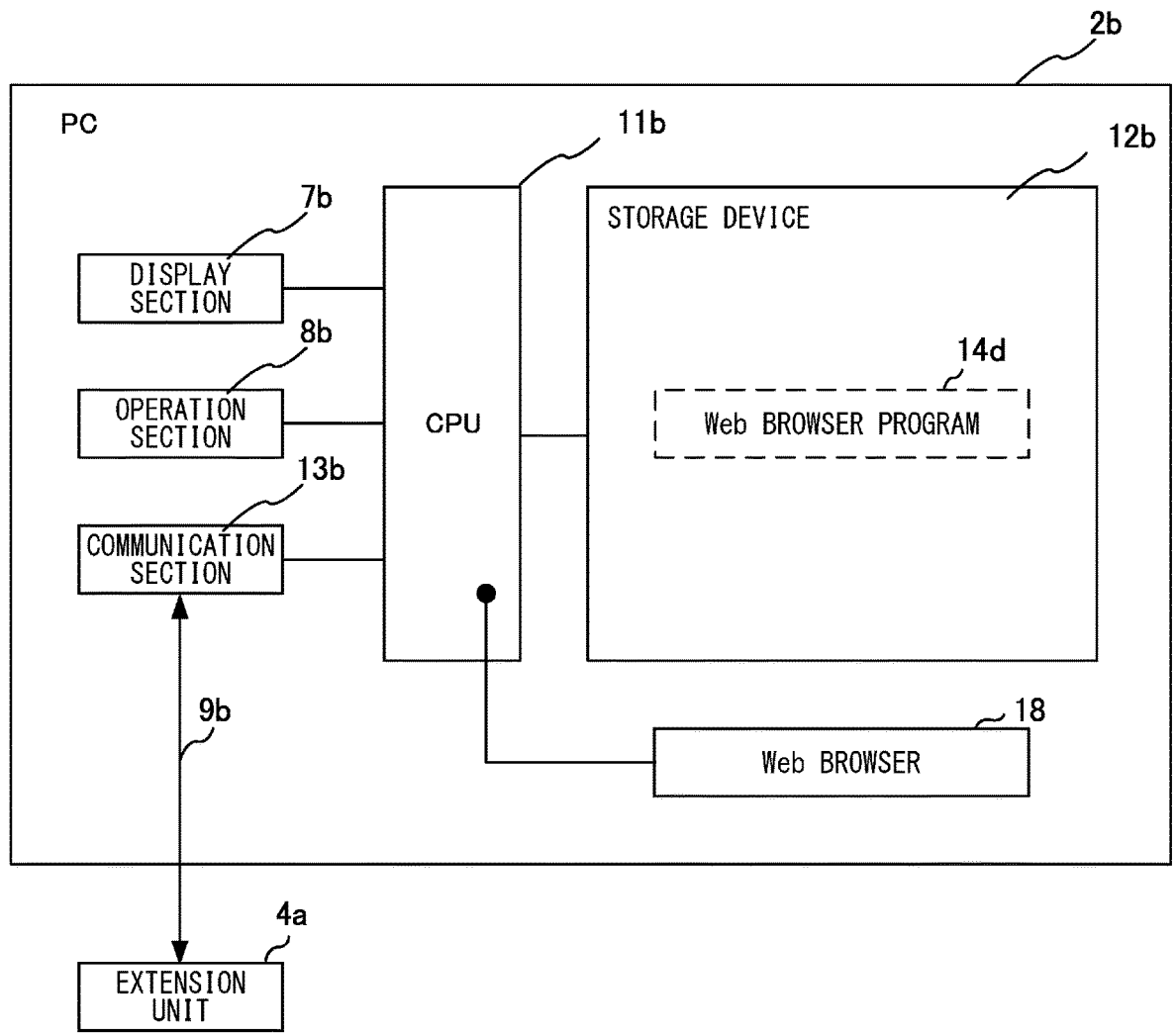
FIG. 3 is a diagram for explaining a PC.

FIG. 3 is a block diagram for explaining an electric configuration of the PC 2b. As shown in FIG. 3, the PC 2b includes a CPU 11b, a display section 7b, an operation section 8b, a storage device 12b, and a communication section 13b. The display section 7b, the operation section 8b, the storage device 12b, and the communication section 13b are respectively electrically connected to the CPU 11b. The storage device 12b includes a RAM, a ROM, a HDD, and an SSD and may further include a detachable memory card.

The CPU 11b executes a Web browser program 14d to realize a Web browser 18. The Web browser 18 accesses, via the communication section 13b, a setting page of the data utilization application provided by the extension unit 4a and accesses a page of the dashboard.

PLC

Figure 4:
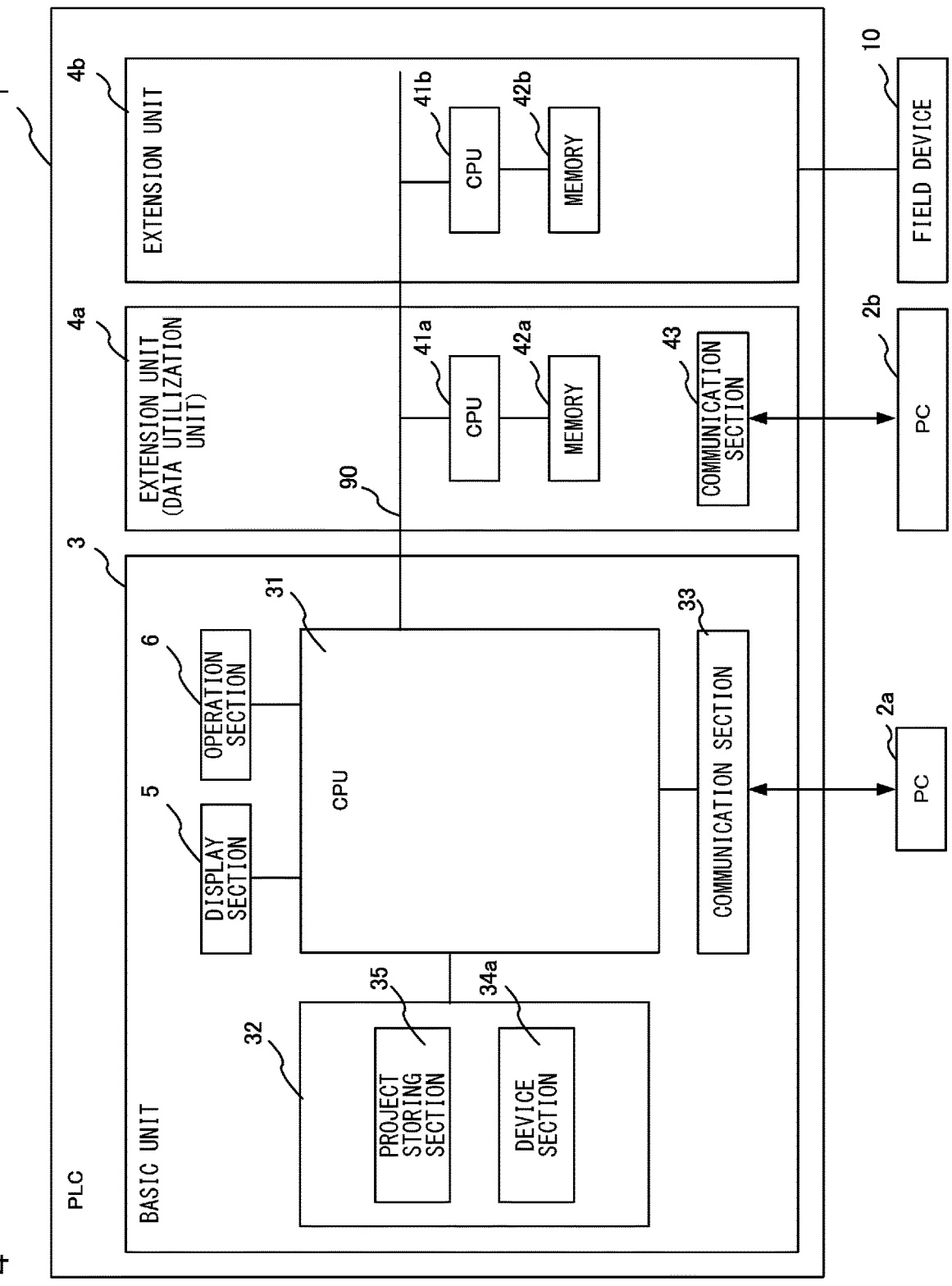
FIG. 4 is a diagram for explaining a PLC.

FIG. 4 is a block diagram for explaining an electric configuration of the PLC 1. As shown in FIG. 4, the basic unit 3 includes a CPU 31, the display section 5, the operation section 6, a storage device 32, and a communication section 33. The display section 5, the operation section 6, the storage device 32, and the communication section 33 are respectively electrically connected to the CPU 31. The storage device 32 may include a RAM, a ROM, and a memory card. The storage device 32 includes a plurality of storage regions such as a device section 34 and a project storing section 35. The device section 34 includes a bit device and a word device. The devices store device values. The project storing section 35 stores project data input from the PC 2a. The storage device 32 stores a control program for the basic unit 3 as well. As shown in FIG. 4, the basic unit 3 and the extension units 4 are connected via an extension bus 90, which is a type of a communication bus. Note that, in FIG. 4, a communication circuit concerning the extension bus 90 is implemented in the CPU 31 but may be implemented as a part of the communication section 33. The communication section 33 may include a network communication circuit. The CPU 31 receives project data from the PC 2a via the communication section 33.

The extension bus 90 is supplementarily explained. The extension bus 90 is a communication bus used for input and output refresh. The input and output refresh is processing for updating a device value between the basic unit 3 and the extension units 4. The input and output refresh is executed every time a ladder program is executed once (that is, in every one scan). Note that one scan period includes an execution period of the input and output refresh, an execution period of a user program, and an execution period of end processing.

A CPU 41a of the extension unit 4a functioning as a data utilization unit communicates with the PC 2b via the communication section 43 and the cable 9b. The data utilization unit is an extension unit that executes a data utilization application. The data utilization application includes a flow for collecting control data and performing data processing and a dashboard that displays an execution result of the flow. Note that a function of collecting control data may be realized by a user program other than the data utilization application. The flow may include an arithmetic operation block for collecting data, an arithmetic operation block for executing data processing, and an arithmetic operation block for creating display data. The dashboard includes a graph display component and a numerical value display component. These display components may be realized by HTML data, CSS data, a Java Script (registered trademark) code, and the like. Note that an aggregate of the HTML data, the CSS data, and the Java Script (registered trademark) code may be called Web application. In this embodiment, the flow is realized by a flow template. The flow template is prepared in advance for each of applications. The flow template includes one or more arithmetic operation blocks in which parameters designated by the user are set. The dashboard is also realized by a template. The dashboard template includes one or more display components in which parameters designated by the user are set. The parameters are, for example, a variety of information such as a name of the dashboard, a device name, a numerical value, and a unit variable name. The unit variable is a variable for the extension unit 4a to hold an execution result of the flow.

Functions Realized by the CPU of the Basic Unit

Figure 5:
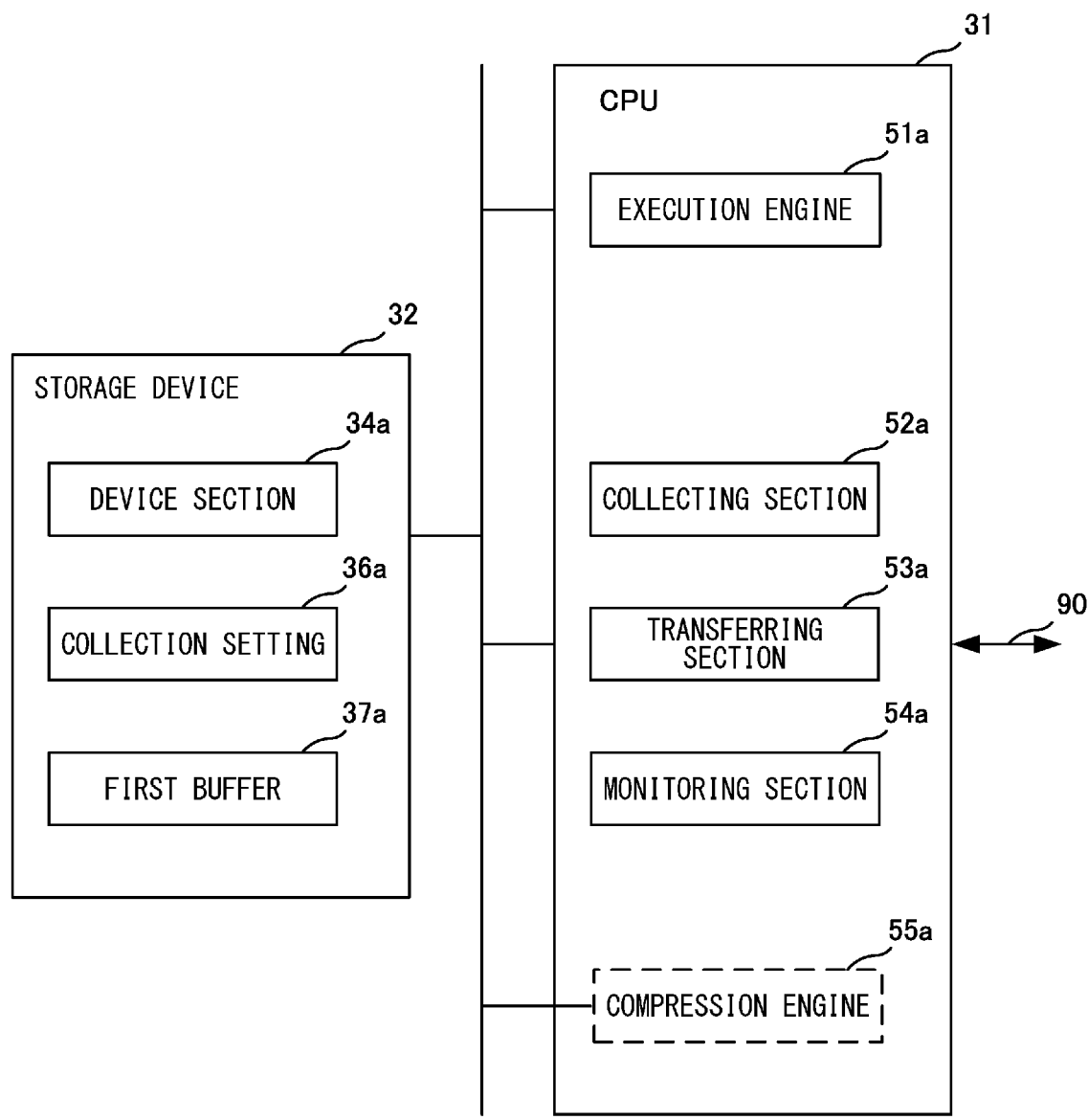
FIG. 5 is a diagram for explaining a basic unit.

FIG. 5 shows functions realized by the CPU 31 concerning data utilization. An execution engine 51 repeatedly executes a user program at every scan period. The execution engine 51 may be realized by an ASIC, an FPGA, or the like provided on the outside of the CPU 31. The ASIC is an abbreviation of application specific integrated circuit. The FPGA is an abbreviation of field programmable gate array. These dedicated circuits can often execute specific data processing at higher speed than a combination of a CPU and a program. A collecting section 52a collects a collection target device value from the device section 34 in a period of end processing in the scan period, creates a data record, and stores the data record in a first buffer 37a. Note that it is not essential to collect data in the period of the end processing. A description (a program code such as a trigger command) for collecting data may be included in the user program executed by the execution engine 51. However, when data is collected by the end processing, there is an advantage that a change of the user program is unnecessary. A collection period may be a period designated by collection setting 36a. By providing the first buffer 37a, the execution engine 51 is less easily affected by, for example, extension of a scan time due to collection and transfer processing. The collection target device value is designated by the collection setting 36a. The collection setting 36a can be stored in the basic unit 3 by the PC 2a or the extension unit 4a. A transferring section 53a transfers one or more data records stored in the first buffer 37a to the extension unit 4a via the extension bus 90. Note that, when communication traffic in the extension bus 90 is free, the transferring section 53a executes the transfer processing. Therefore, the transfer processing is executed avoiding a period in which an execution engine 51a is executing the input and output refresh and a period in which data is read out from the buffer memory of the extension unit 4 according to a readout command described in the user program. Note that the communication traffic in the extension bus 90 is monitored by a monitoring section 54a. In order to reduce a transfer time for the data record, a compression engine 55a may compress a plurality of data records. The compression engine 55a does not need to be realized by the CPU 31 and may be realized by an ASIC, an FPGA, or the like. By adopting the first buffer 37a in this way, it is possible to asynchronously execute the transfer processing and the user program.

Function of the Data Utilization Unit

Figure 6:
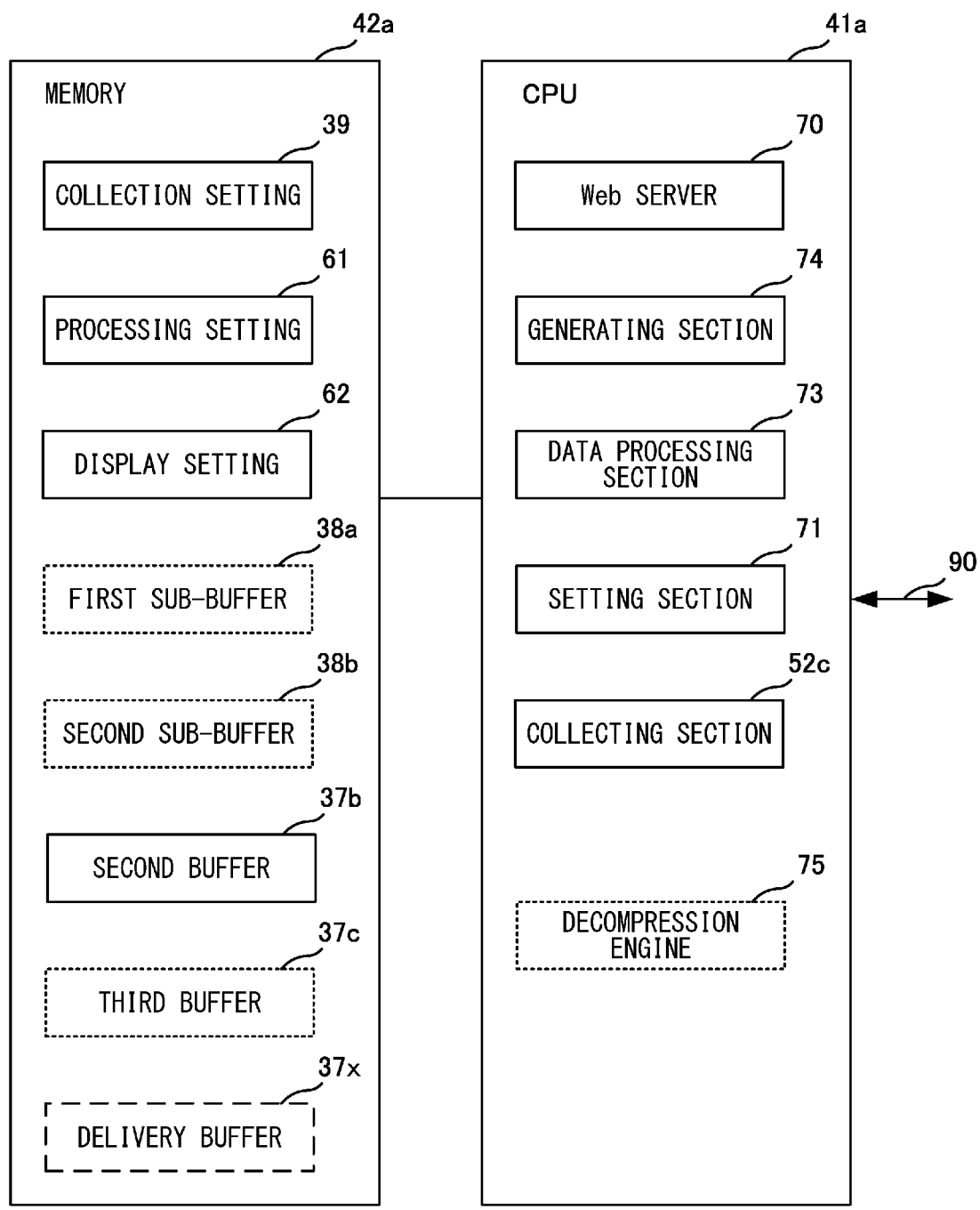
FIG. 6 is a diagram for explaining a data utilization unit.

FIG. 6 is a diagram for explaining functions realized by the CPU 41a of the extension unit 4a.

A collecting section 52c is a function of collecting data according to collection setting 39. The collecting section 52c can be realized by the CPU 41a executing a control program such as a user program. The collecting section 52c sets the basic unit 3 to collect a device value designated by the collection setting 39 and transfer the device value to a second buffer 37b of the extension unit 4a. Note that the collecting section 52c may write, in the storage device 32 of the basic unit 3, the collection setting 36a of the basic unit 3 included in the collection setting 39. The collecting section 52c and a data processing section 73 desirably can basically operate asynchronously. A buffer may be provided in order to realize this.

The collecting section 52c may set the extension unit 4b to collect a device value designated by the collection setting 39 and transfer the device value to a third buffer 37c of the extension unit 4a. By providing the second buffer 37b and the third buffer 37c, even if a processing load of the data processing section 73 fluctuates, data can be collected without fail. The collecting section 52c may write, in a memory 42b of the extension unit 4b, collection setting 36b (FIG. 7) of the extension unit 4b included in the collection setting 39. Note that these setting functions may be realized by a setting section 71. The setting section 71 receives the collection setting 39, processing setting 61, and display setting 62 from the PC 2a or the PC 2b and writes the collection setting 39, the processing setting 61, and the display setting 62 in a memory 42a. The processing setting 61 includes information and a flow (a program) for defining data processing executed on collected data by the data processing section 73. The display setting 62 includes a template (HTML data, a CSS, a code of Java Script (registered trademark), or the like) of a dashboard that provides a data processing result to the Web browser 18 through a Web server 70. A generating section 74 substitutes, according to the display setting 62 for defining display components of the dashboard, the data processing result in the template of the dashboard to create display data of the dashboard. The display data may be, for example, HTML data or image data, a CSS (cascading style sheet), a code of Java Script (registered trademark), or the like. The display components include, for example, a pie graph component, a bar graph component, a polygonal line graph component, or a numerical value display component.

When a Web page of the dashboard is accessed by the Web browser 18, the Web server 70 transmits the display data of the dashboard to the Web browser 18. The Web browser 18 receives the display data and displays the dashboard.

Note that a plurality of data utilization applications are sometimes provided. In this case, necessary data and readout timing are sometimes different for each of the data utilization applications. In this case, a sub-buffer may be secured in the memory 42a for each of the data utilization applications. The collecting section 52c reads out a data record stored in the second buffer 37b and stores data for a first data utilization application in a first sub-buffer 38a. The collecting section 52c reads out the data record stored in the second buffer 37b and stores data for a second data utilization application in a second sub-buffer 38b. Note that the collecting section 52c may read out a data record stored in the third buffer 37c and store the data for the first data utilization application in the first sub-buffer 38a. The collecting section 52c may read out the data record stored in the third buffer 37c and store the data for the second data utilization application in the second sub-buffer 38b. The data processing section 73 reads out data from the first sub-buffer 38a, executes data processing, and generates a processing result according to the first data utilization application. The data processing section 73 reads out data from the second sub-buffer 38b, executes data processing, and generates a processing result according to the second data utilization application. A decompression engine 75 has a function of forming a pair with the compression engine 55a of the basic unit 3 and a compression engine 55b of the extension unit 4b. The decompression engine 75 decompresses data compressed and transferred by the basic unit 3 and stores the data in the second buffer 37b. The decompression engine 75 decompresses data compressed and transferred by the extension unit 4b and stores the data in the third buffer 37c. Consequently, congestion of communication traffic of the extension bus 90 would be reduced. The decompression engine 75 may be realized by an ASIC, an FPGA, or the like. In this way, transfer of data between the basic unit 3 and the extension units 4a and 4b is executed via the extension bus 90.

Figure 16:
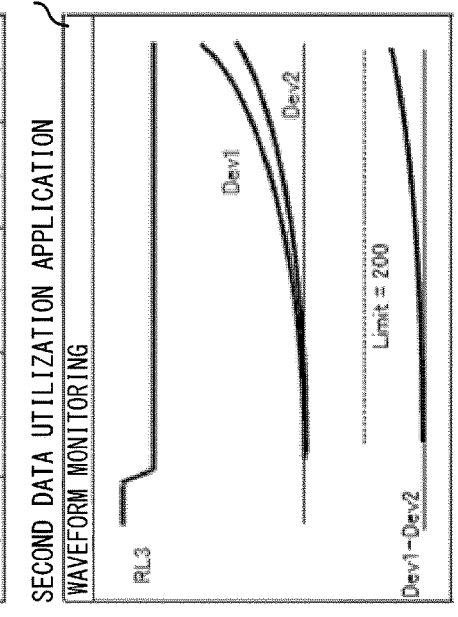
FIG. 16 is a diagram for explaining a utilization example of a sub-buffer.

A plurality of data are sometimes necessary for each of data utilization applications. In that case, the necessary plurality of data are sometimes stored in a sub-buffer while a chunk of data collected by scans is maintained in a buffer. Further, when the data is distributed to the sub-buffer, a time stamp or the like may be given to records. As shown in FIG. 16, the second buffer 37b (or the third buffer 37c) holds the collected chunk of the data. One record includes a scan number, a value of a timer (a time stamp), and the collected data. In this example, the collected data includes relays RL1 to RL3 and devices Dev1 and Dev2. A first data utilization application 1601 needs the relays RL1 to RL3 among the collected data. Therefore, the scan number, the value of the timer, and the relays RL1 to RL3 are read out from the second buffer 37b and stored in the first sub-buffer 38a. The first data utilization application 1601 reads out the scan number, the value of the timer, and the relays RL1 to RL3 from the first sub-buffer 38a and creates a display screen (source data). A second data utilization application 1602 needs the relay RL3 and the devices Dev1 and Dev2 among the collected data. Therefore, the scan number, the value of the timer, the relay RL3, and the devices Dev1 and Dev2 are read out from the second buffer 37b and stored in the second sub-buffer 38b. The second data utilization application 1602 reads out the scan number, the value of the timer, the relay RL3, and the devices Dev1 and Dev2 from the second sub-buffer 38b and creates a display screen (source data). By utilizing the sub-buffers in this way, it is possible to maintain original data in the buffers without changing the original data. The original data held in the buffers can be used for other purposes.

Functions of the Extension Unit 4b Relating to Data Utilization

Figures 7, 8:
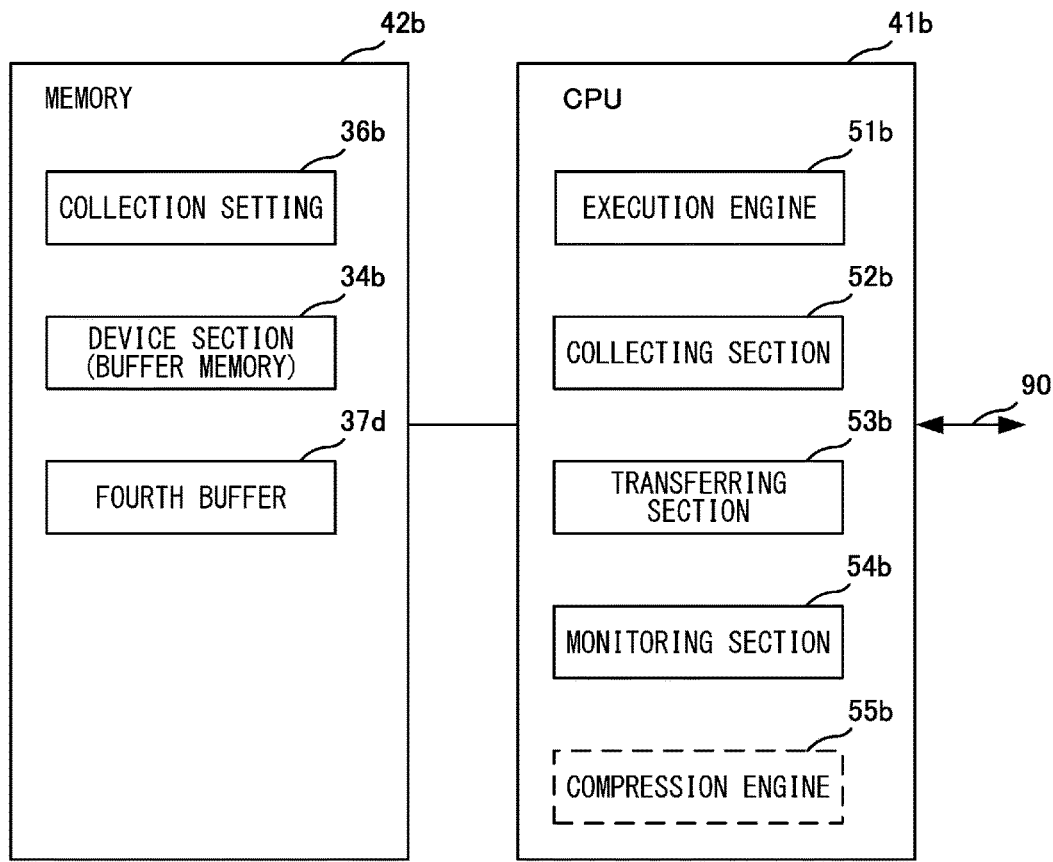
FIG. 7 is a diagram for explaining an extension unit.
FIG. 8 is a diagram for explaining a format of data records.

FIG. 7 is a diagram for explaining functions realized by a CPU 41b of the extension unit 4b.

An execution engine 51b executes a basic function (in a motion unit, for example, execution of a motion flow) of the extension unit 4b. A collecting section 52b collects data designated by the collection setting 36 from a device section 34b at timing designated by the collection setting 36 and stores the data in a fourth buffer 37d. A transferring section 53b reads out a data record stored in the fourth buffer 37d at timing designated by the collection setting 36 or timing when a transfer request is received by the extension unit 4a and transfers the data record to the third buffer 37c of the extension unit 4a via the extension bus 90. Note that the transferring section 53b may execute the transfer of the data record at timing when communication traffic of the extension bus 90 monitored by a monitoring section 54 is small. The compression engine 55b compresses the data record according to the collection setting 36. That is, the transferring section 53b may transfer the data record compressed by the compression engine 55b to the extension unit 4a. The compression engine 55b may be realized by the CPU 41b. However, from the viewpoint of high-speed processing and the viewpoint of a reduction in a processing load of the CPU 41b, the compression engine 55b may be realized by an ASIC or an FPGA.

Example of Data Records

FIG. 8 shows data records 91 written in the first buffer 37a by the collecting section 52a. A plurality of data records are an example of time-series data. In this example, the collecting section 52a collects, at every one scan period, device values with device names Dev0, Dev1, and Dev10 from a device section 34a, adds a collection count and time information acquired from a timer to the device values, creates one data record, and stores the data record in the first buffer 37a. Note that a collection target may be data stored in a buffer memory or a device allocated to the extension unit 4b. In this example, the first buffer 37a is a buffer of an FIFO (first-in first-out) type. The collection count is a count value of a counter counted up every time one data record is collected. The collection count is a sequentially given number. Therefore, the collection count is useful for detecting omission and compression of a data record.

Time information such as a time stamp is useful, for example, when data acquired by the basic unit 3 and data acquired by the extension unit 4b are comparably displayed on a dashboard. In general, collection timing in the basic unit 3 and collection timing in the extension unit 4b do not coincide. Accordingly, in order to compare the operation of the basic unit 3 and the operation of the extension unit 4b, information for linking the data of the basic unit 3 and the data of the extension unit 4b is necessary. In general, the basic unit 3 and the extension units 4a and 4b can synchronize time information through inter-unit synchronization or the like. Therefore, the basic unit 3 and the extension unit 4 respectively give time information at the time when data records are collected to the data records. Consequently, the data processing section 73 can match a plurality of data records acquired by different units on a time axis.

Timing of Transfer

Figures 9, 10:
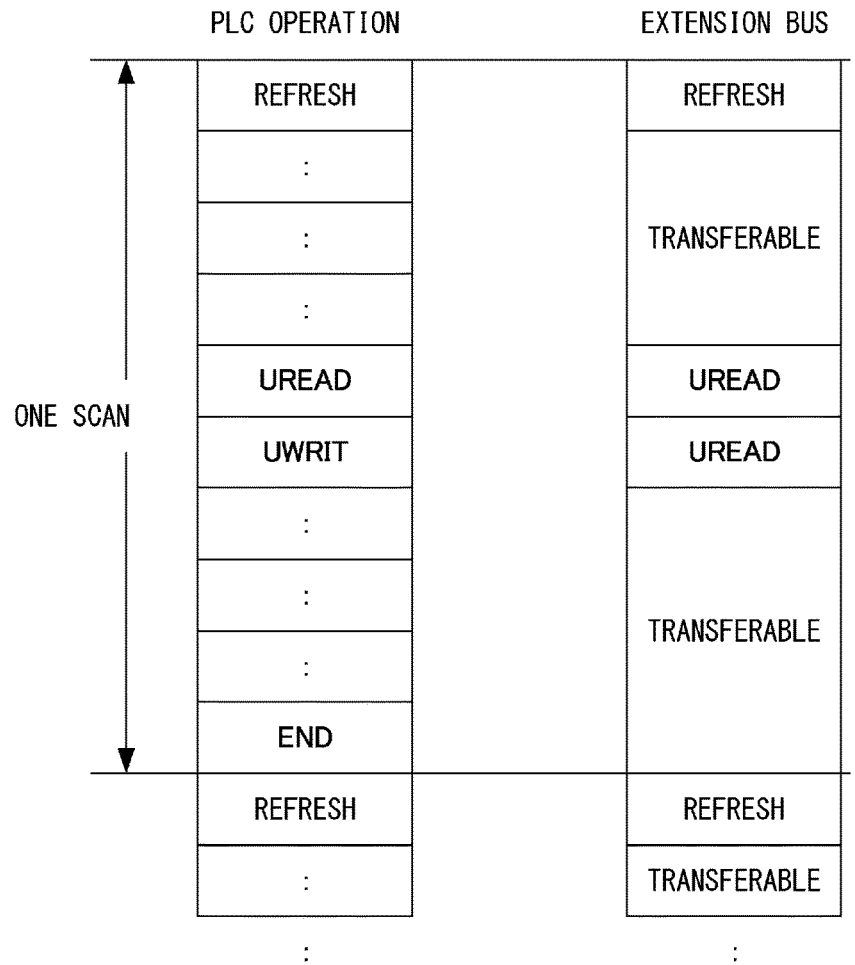
FIG. 9 is a diagram for explaining transfer timing.
FIG. 10 is a diagram for explaining a format of a data record.

FIG. 9 is a diagram for explaining transfer timing of a data record. As shown in FIG. 9, the PLC 1 repeatedly executes input and output refresh, a user program, and end processing. In order to reduce extension of a scan period, transfer processing is executed avoiding a period of input and output refresh. Similarly, in order to reduce extension of the scan period, the transfer processing is executed avoiding execution periods of UREAD and UWRIT. The UREAD is a command for reading out data from a buffer memory allocated to the extension unit 4 and is described in the user program. Accordingly, the basic unit 3 accesses the extension unit 4 and acquires data from the buffer memory according to the UREAD during an execution period of the user program. The UWRIT is a command for writing data in the buffer memory allocated to the extension unit 4 and is described in the user program. The basic unit 3 accesses the extension unit 4 and writes data in the buffer memory according to the UWRIT during the execution period of the user program.

As shown in FIG. 9, the transfer processing is executed in the extension bus 90 in a transferable period excluding the input and output refresh, the UREAD, and the UWRIT. For example, it is assumed that the transfer processing executed for each five data records is set by the collection setting 36a. In this case, the transferring section 53a executes the transfer processing after accumulation of the five data records in the first buffer 37a is completed and in a first transferable period or at timing when a transfer request is received by the extension unit 4a.

Change of Collection Setting

Collection of data may be, for example, always executed in an operation period of a factory. In this case, collection setting used in the morning and collection setting used in the afternoon are sometimes different. In this case, it would be convenient if it is possible to easily identify which data record among a plurality of data records is acquired based on first collection setting and which data record is acquired based on second collection setting.

FIG. 10 shows a format of the data record 91 adaptable to a halfway change of collection setting. In this example, identification information for distinguishing a plurality of collection settings is added to the data record 91. Identification information "1" corresponds to the first collection setting. In the first collection setting, collection target devices are Dev1 and Dev10. Identification information "2" corresponds to the second collection setting. In the second collection setting, collection target devices are Dev1, Dev10, and Dev11. When such a format is adopted, the data processing section 73 is capable of dividing data processing targets for each collection setting and executing data processing. For example, the identification information "1" may correspond to first data processing setting and the identification information "2" may correspond to second data processing setting. The data processing section 73 may acquire data processing setting corresponding to identification information from the processing setting 61 and apply data processing to a data record according to the acquired data processing setting.

Information Compression

Figure 11:
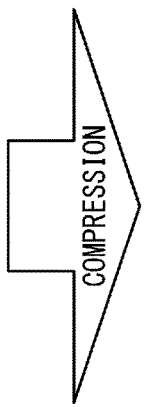
FIG. 11 is a diagram for explaining information compression.

FIG. 11 is a diagram for explaining information compression for data records. A data record group 92a indicates data records before the information compression. Four relay devices RL1, RL2, RL3, and RL4 are designated as collection targets. A scan number is adopted as a collection count. A counter may be time information (for example, a numerical value indicating a time interval from ON to OFF of a certain relay) acquired by a timer or the like. A change point of relay devices is absent between a data record with a scan number "1" and a data record with a scan number "2" in the data record group 92a. That is, the data record with the scan number "2" can be compressed (discarded or deleted). However, the relay device RL1 of a data record with a scan number "3" and the relay device RL1 of the data record with the scan number "1" are different. Since the scan number "3" has a change point in this way, the data record with the scan number "3" is not compressed. Since a change point of a relay device is absent between the data record with the scan number "3" and a data record with a scan number "4", the data record with the scan number "4" can be compressed. Similarly, since a change point of a relay device is absent between a data record with a scan number "5" and a data record with a scan number "6" is absent, the data record of the scan number "6" can be compressed. By executing such information compressing focusing on the change points, a compressed data record group 92b is realized. Data records forming the compressed data record group 92b have change points.

As shown in FIG. 16, the scan number, the value of the timer, and the relays RL1 to RL3 may be read out from the second buffer 37b (or the third buffer 37c), compressed, and stored in the first sub-buffer 38a. In a period in which a change point of a relay device is absent, the scan number (for example, 2), the value of the timer (for example, 450), and the relays RL1 to RL3 (for example, ON, OFF, OFF) may not be stored in the first sub-buffer 38a. When a change point of a relay device is present, the scan number (for example, 3), the value of the timer (for example, 560), and the relays RL1 to RL3 (for example, OFF, OFF, OFF) may be read out from the second buffer 37b (or the third buffer 37c) and stored in the first sub-buffer 38a. The first data utilization application 1601 reads out the scan number, the value of the timer, and the relays RL1 to RL3 from the first sub-buffer 38a and creates a display screen (source data).

Example of a Dashboard

Figure 12:
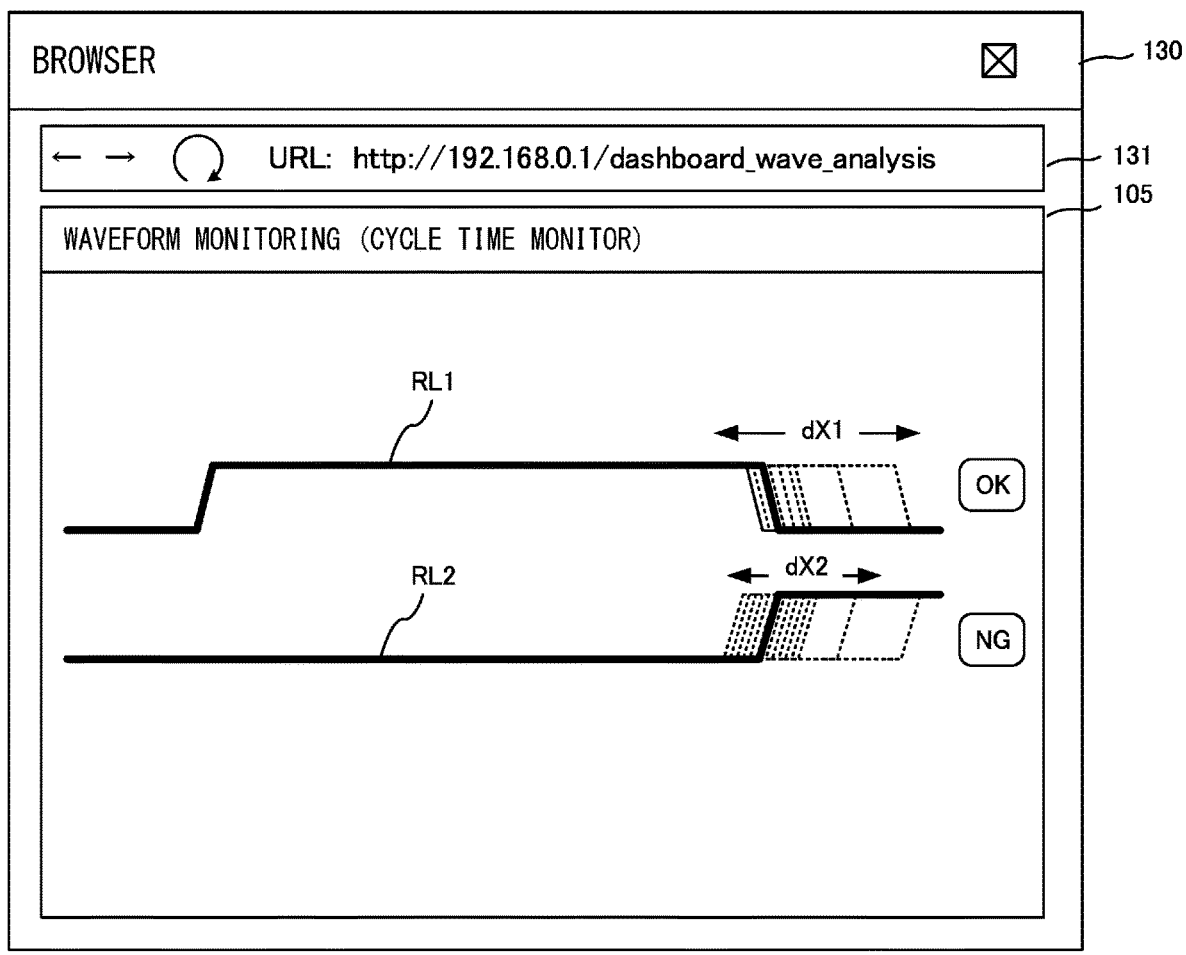
FIG. 12 is a diagram showing an example of a dashboard.

FIG. 12 shows a UI 130 of the Web browser 18. The UI 130 includes a URL input section 131 and a display region 105 of a dashboard. A URL allocated to the dashboard is input to the URL input section 131. A data processing result calculated from collection target data by the data processing section 73 is shown in the display region 105. In this example, waveforms of the relay devices RL1 and RL2 are included. Since a data record is collected at every scan period, for example, when data collection is continued throughout a day, a large number of data records are collected. The data processing section 73 superimposes and displays a plurality of waveforms acquired about the relay device RL1 based on rising of the relay device RL1. In this example, a shift occurs in timing of falling of the relay device RL1. For example, the data processing section 73 may calculate an average of the plurality of waveforms and displays a waveform equivalent to the average with a thick line. A success range dX1 may be present about the shift of the falling. If timing of each falling is included in the success range dX1, the data processing section 73 may determine that the data processing is success. The data processing section 73 may execute the same processing about the relay device RL2. However, since a shift of rising is not included in a success range dX2 about the relay device RL2, the data processing section 73 may determine that the data processing is failure.

When the failure occurs in this way, the CPU 41a may transmit an error report mail to a predetermined mail address. A link including a URL of a dashboard may be included in the error report mail. A receiver of the error report mail clicks the link to start the Web browser 18, display the dashboard, and confirm a waveform to eliminate a cause of the error.

Note that there is a motion unit as the extension unit 4b. The motion unit operates an industrial machine with the basic unit 3 according to a command value and holds an operation result of the industrial machine. A command value may be, for example, a coordinate of an arm of an arm-type robot. The operation result (a present value) may be a coordinate of an actual arm acquired by a sensor or the like. The extension unit 4a may acquire a command value and a present value corresponding to the command value from the extension unit 4b as time-series data and display deviation between the command value and the present value on a dashboard. The data processing section 73 may calculate a difference between the command value and the present value and display, on the dashboard, a graph showing how the difference changes according to elapse of time. The user would easily determine, by confirming such a waveform, whether a cause of an occurred error is the life of a consumable article or a sudden event applied from the outside. For example, a response from a waveform sometimes gradually delays when the end of the life of the consumable article approaches. On the other hand, when the error occurs because of the sudden event, a change in the waveform occur only at occurrence time of the event. Accordingly, the user would be capable of finding the error cause by observing the waveform and apply measures to the error.

Flowchart

Extension Unit 4a

Figure 13:
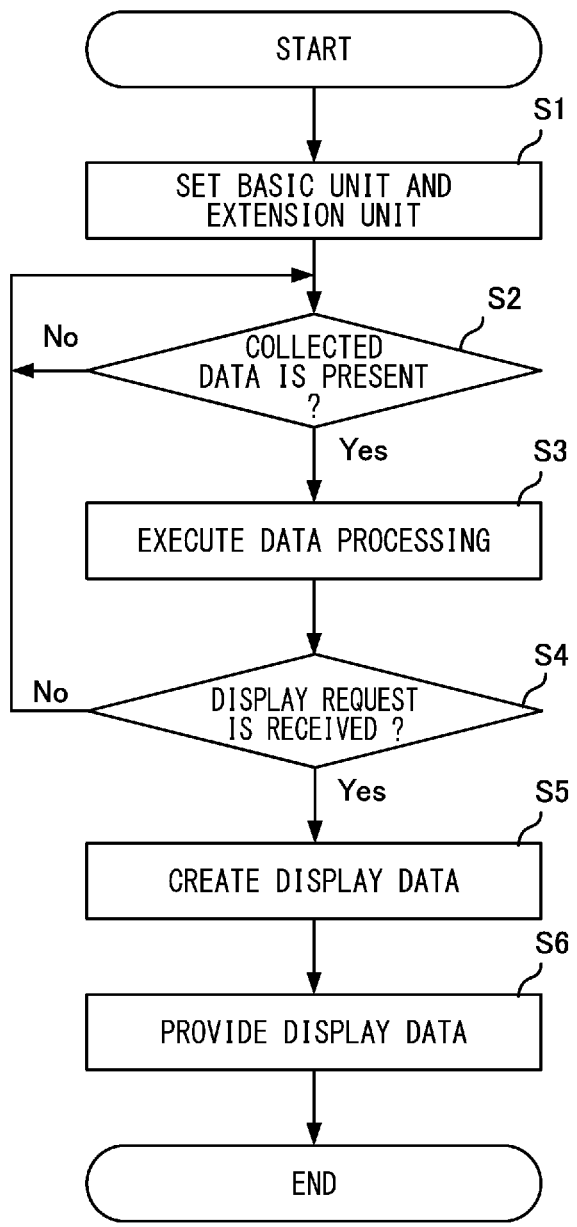
FIG. 13 is a flowchart showing a collecting and transferring method.

FIG. 13 is a flowchart showing collection processing executed by the CPU 41a of the extension unit 4a. When a specific relay device is turned on, the CPU 41a executes the following processing.

In S1, the CPU 41a (the setting section 71) sets the basic unit 3 and the extension unit 4b. For example, the CPU 41a transfers the collection setting 36a for the basic unit 3 to the basic unit 3. The basic unit 3 stores the collection setting 36a in the storage device 32. The CPU 41a transfers the collection setting 36b for the extension unit 4b to the extension unit 4b. The extension unit 4b stores the collection setting 36b in the memory 42b.

In S2, the CPU 41a (the data processing section 73 or the collecting section 52c) determines whether a predetermined amount of collected data is stored in the second buffer 37b or the third buffer 37c (the first sub-buffer 38a or the second sub-buffer 38b). The predetermined amount is defined by the processing setting 61. A buffer designated by the processing setting 61 only has to be confirmed. Not both of the second buffer 37b and the third buffer 37c are always confirmation targets. The CPU 41a stays on standby until the predetermined amount of data is stored in the buffer. When the predetermined amount of data is stored in the buffer, the CPU 41a proceeds to S3.

In S3, the CPU 41a (the data processing section 73) executes data processing on the predetermined amount of data read out from the buffer and calculates a data processing result. Content of the data processing is defined by the processing setting 61. The data processing result is held in the memory 42a.

In S4, the CPU 41a (the generating section 74) determines whether a display request (a Web access) for a dashboard is received from the Web browser 18 of the PC 2b. If the display request is not received, the CPU 41a proceeds to S2 and continues the collection of data and the data processing. If the display request is received, the CPU 41a proceeds to S5.

In S5, the CPU 41a (the generating section 74) creates display data of the dashboard corresponding to the display request. For example, the CPU 41a substitutes the data processing result stored in the memory 42a in a template of the dashboard and creates display data.

In S6, the CPU 41a (the Web server 70) transmits the display data to the Web browser 18 of the PC 2b. Consequently, the Web browser 18 of the PC 2b can display the dashboard.

Basic Unit 3

Figure 14:
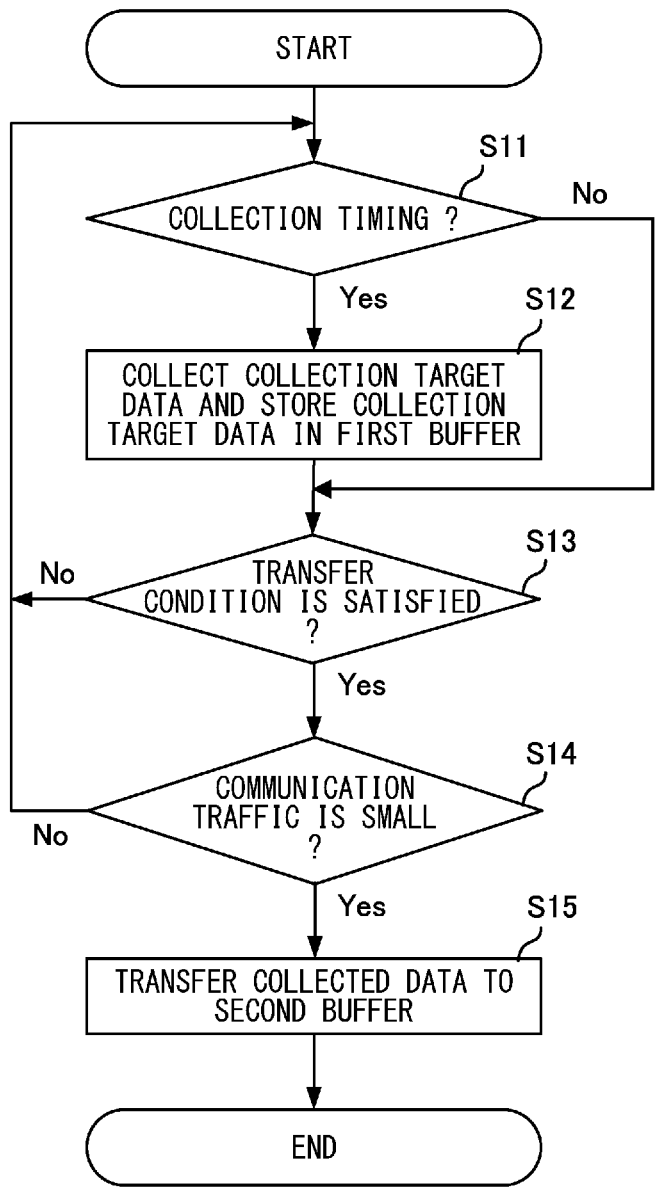
FIG. 14 is a flowchart showing a collecting and transferring method.

FIG. 14 is a flowchart showing collection processing executed by the CPU 31 of the basic unit 3. When a specific relay device is turned on, the CPU 31 executes the following processing.

In S11, the CPU 31 (the collecting section 52a) determines whether collection timing (for example, every one scan period, every input of a trigger signal, or every predetermined period) designated by the collection setting 36a has come. When the collection timing has come, the CPU 31 proceeds to S12.

In S12, the CPU 31 (the collection setting 52a) collects collection target data designated by the collection setting 36a from the device section 34a and stores the collection target data in the first buffer 37a.

In S13, the CPU 31 (the transferring section 53a) determines whether a transfer condition designated by the collection setting 36a is satisfied. The transfer condition may be the number of data records accumulated in the first buffer 37a. If the transfer condition is not satisfied, the CPU 31 returns to S11 and continues the collection of data. If the transfer condition is satisfied, the CPU 31 proceeds to S14.

In S14, the CPU 31 (the monitoring section 54a) determines whether communication traffic of the extension bus 90 is small. If the communication traffic is large, the CPU 31 returns to S11 and continues the collection of data. If the communication traffic is small, the CPU 31 proceeds to S15.

In S15, the CPU 31 (the transferring section 53a) reads out a predetermined amount of data records from the first buffer 37a and transfers the predetermined amount of data records to the second buffer 37b. The predetermined amount is also defined by the collection setting 36a.

Extension Unit 4b

Figure 15:
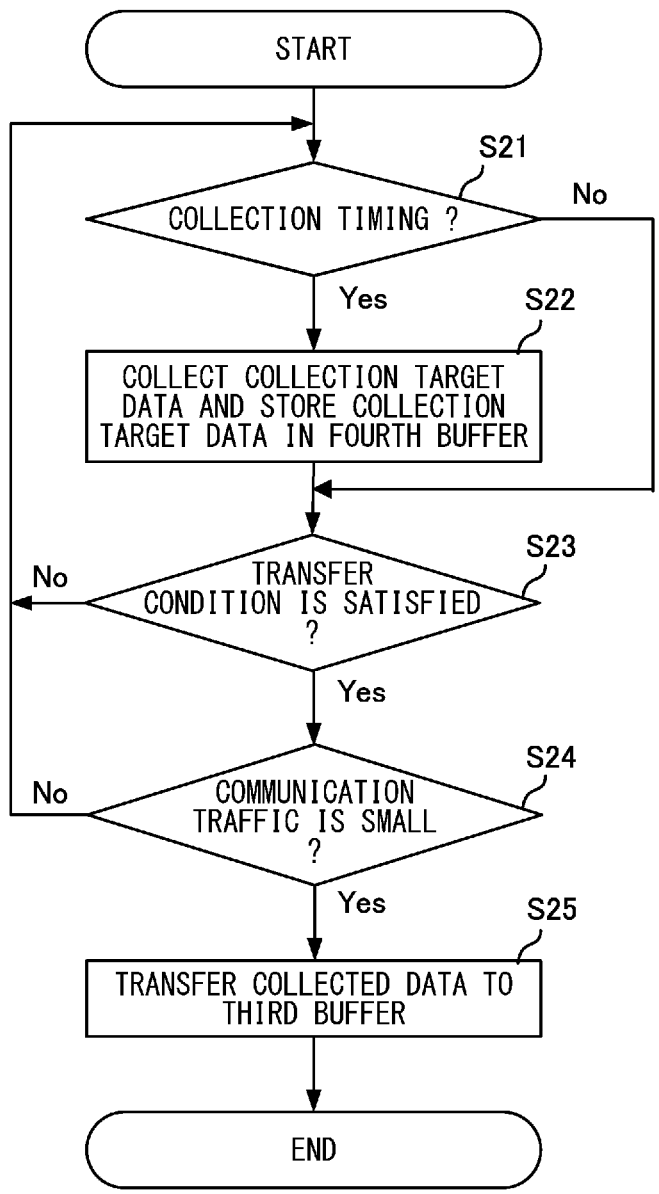
FIG. 15 is a flowchart showing a collecting and transferring method.

FIG. 15 is a flowchart showing collection processing executed by the CPU 41b of the extension unit 4b. When a specific relay device is turned on, the CPU 41b executes the following processing.

In S21, the CPU 41b (the collecting section 52b) determines whether collection timing (for example, every input of a trigger signal or every predetermined period) designated by the collection setting 36b has come. When the collection timing has come, the CPU 41b proceeds to S22.

In S22, the CPU 41b (the collecting section 52b) collects collection target data designated by the collection setting 36a from the device section 34a and stores the collection target data in the fourth buffer 37d.

In S23, the CPU 41b (the transferring section 53b) determines whether a transfer condition designated by the collection setting 36b is satisfied. The transfer condition may be, for example, the number of data records accumulated in the fourth buffer 37d. If the transfer condition is not satisfied, the CPU 41b returns to S21 and continues the collection of data. If the transfer condition is satisfied, the CPU 41b proceeds to S24.

In S24, the CPU 41b (a monitoring section 54b) determines whether communication traffic of the extension bus 90 is small. If the communication traffic is large, the CPU 41b returns to S21 and continues the collection of the data. If the communication traffic is small, the CPU 41b proceeds to S25.

In S25, the CPU 41b (the transferring section 53b) reads out a predetermined amount of data records from the fourth buffer 37d and transfers the predetermined amount of data records to the third buffer 37c. The predetermined amount is also defined by the collection setting 36b.

Figure 17:
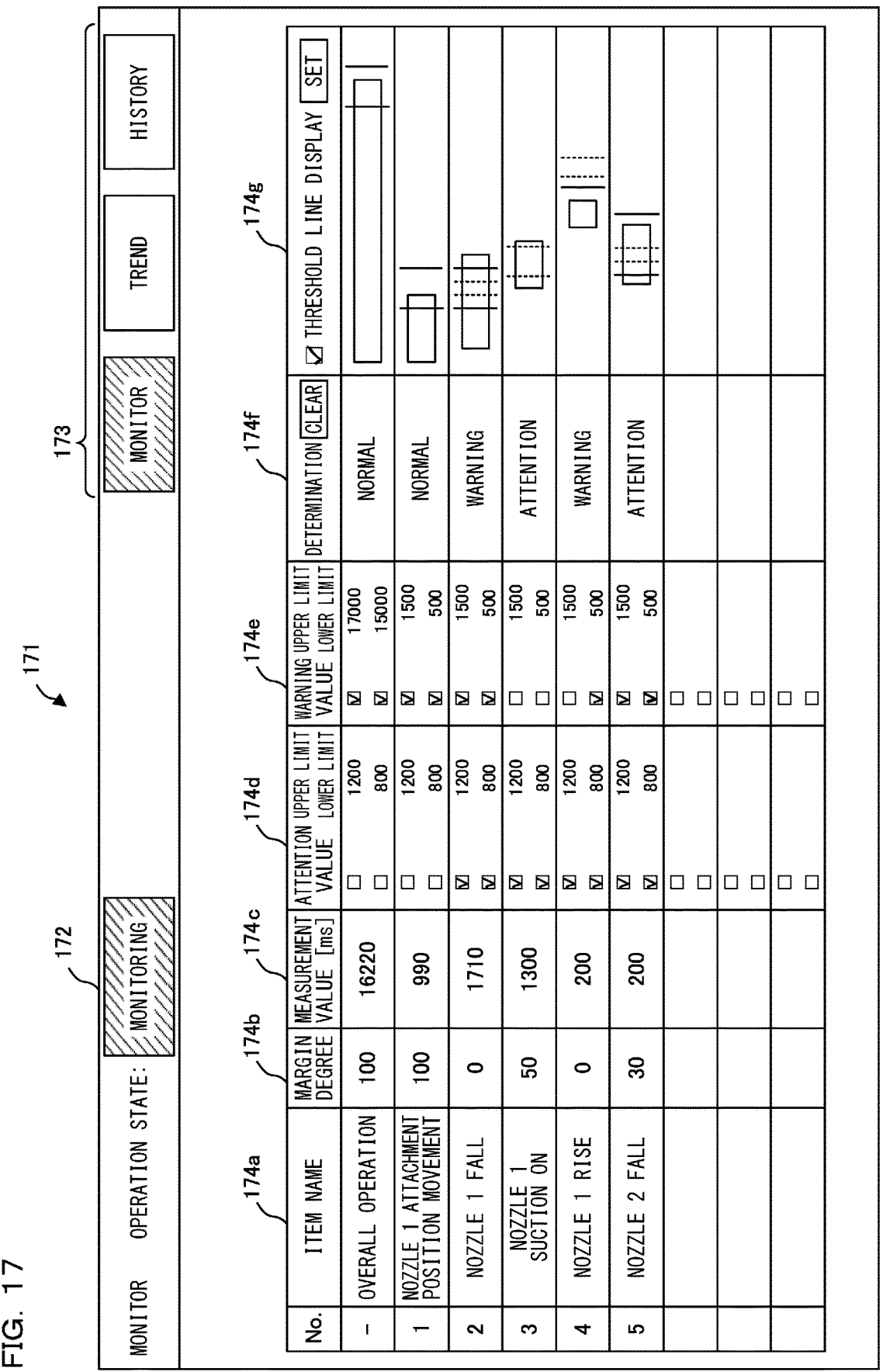
FIG. 17 is a diagram for explaining a dashboard display screen for state monitoring.

FIG. 17 shows an example of a dashboard 171 for the real-time monitoring application. In FIG. 17, operation state display 172 shows an operation state of real-time monitoring. A display switching tab 173 is tab button display for, when a plurality of dashboards are set for an application, switching a dashboard to another dashboard corresponding to the application. In FIG. 17, a state in which a monitor button is pressed is shown. In this state, when a trend tab is pressed, the dashboard is switched to a dashboard of trend display. When a history tab is pressed, the dashboard is switched to a dashboard for history display. In display fields 174a to 174g, an item name, a margin degree, a measurement value, an attention value, a warning value, a determination result, and a graph relating to the measurement value are displayed for each of monitoring items. The item name, the attention value, and the warning value are displayed based on the application setting data (the display setting 62) of the project data 15. The measurement value indicates a time width from the start timing to the end timing determined based on the start condition and the end condition of the application setting data. The margin degree indicates to which degree the measurement value of the monitoring item has a margin. For example, the margin degree may indicate to which degree the measurement value has a margin with respect to the waring value or the attention value. The determination result is a determination result calculated based on the measurement value and an effective warning value or attention value. The determination result may indicate state classes of a monitoring target such as normal, attention, and warning. Even if a determination result based on the latest measurement value is normal, a determination result was sometimes the attention or warning state in the past. In this case, a state in which a warning degree is higher may be maintained in a predetermined determination period from the past to the present. When a clear button of a determination display field 174f is pressed, the displayed determination result may be updated to the latest determination result. A graph relating to the measurement value is a visualized graph of the measurement value. For example, a bar graph showing the time width from the start timing to the end timing may be displayed. Lines corresponding to the attention value and the warning value may be displayed in positions corresponding to the attention value and the warning value. For example, when a threshold line display checkbox of a graph display field 174g is checked, threshold lines corresponding to the effective attention value and the effective warning value are displayed. When a setting button of the graph display field 174g is pressed, a setting dashboard among other dashboards corresponding to the application is displayed.

Figure 18:
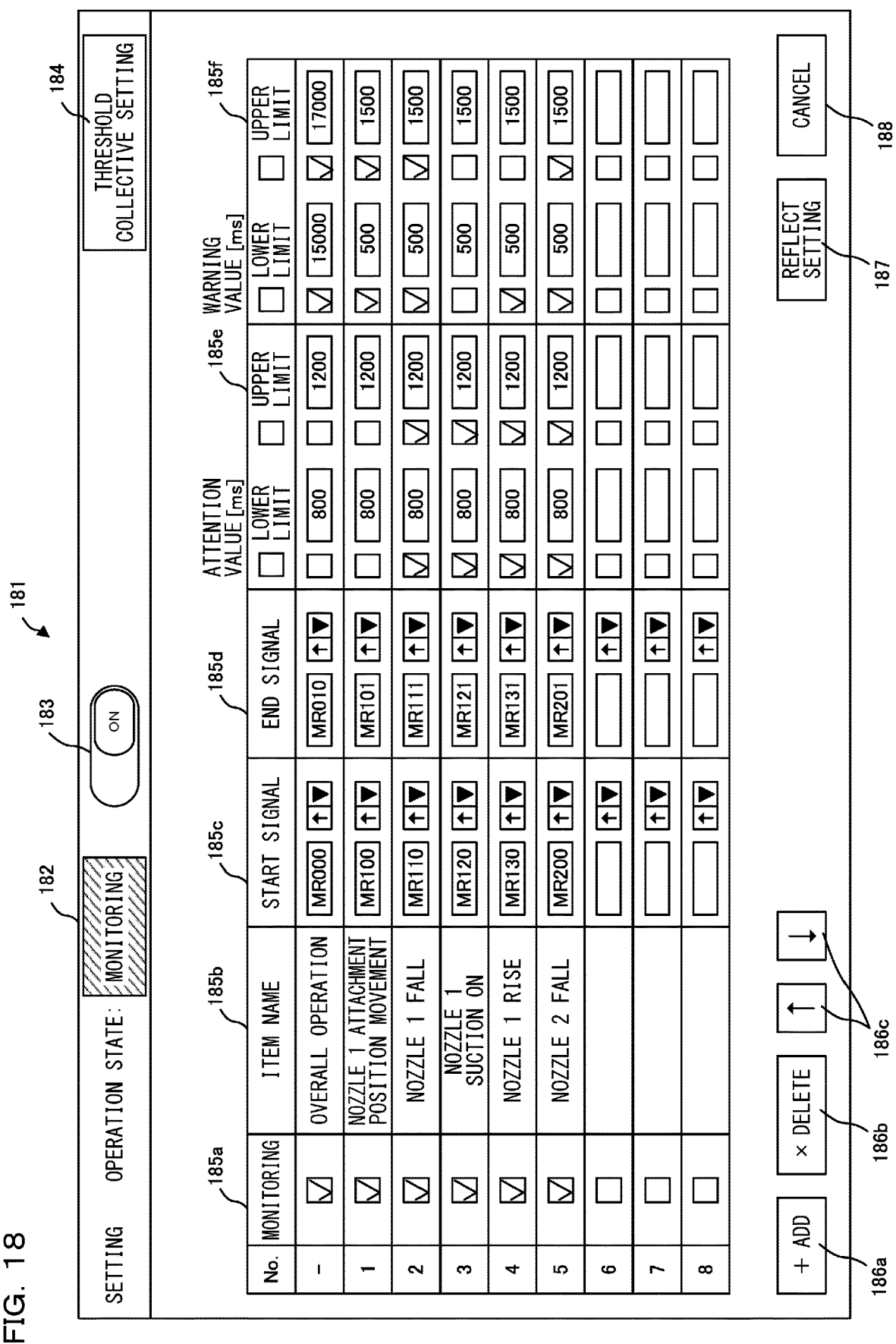
FIG. 18 is a diagram for explaining a dashboard display screen for setting.

FIG. 18 shows an example of a setting dashboard 181 for the real-time monitoring application. When the setting button of the graph display field 174g in FIG. 17 is pressed, the setting dashboard 181 is displayed. In FIG. 18, operation state display 182 shows an operation state of real-time monitoring. A monitoring state changeover switch 183 is a switch for switching a monitoring state and a non-monitoring state of the real-time monitoring. A threshold collective setting button 184 is a button for shifting to a setting screen for collectively setting a plurality of thresholds provided for each of monitoring items. In input fields 185a to 185f, a monitoring checkbox, an item name, a start condition, an end condition, an attention value, and a warning value are displayed for each of monitoring items. An input field corresponding to the setting wizard for setting the application setting data of project data 15 in FIG. 2 may be provided. When an addition button 186a is pressed, an input row for inputting a new monitoring item is added. When a deletion button 186b is pressed, an input row selected by an up down button 186c is deleted. When a setting reflection button 187 is pressed, updated setting content is reflected on the application setting data (the display setting 62). Subsequently, the dashboard 171 for the real-time monitoring application based on the updated application setting data (the display setting 62) is displayed. When a cancel button 188 is pressed, the updated setting content is not reflected on the application setting data (the display setting 62). The dashboard 171 for the real-time monitoring application based on the application setting data (the display setting 62) is displayed.

In S41, the CPU 41a (the collecting section 52c) monitors devices or variables corresponding to a start signal and an end signal according to the application setting data (the collection setting 39). The application setting data (the collection setting 39) holds a name of the device or the variable used as the start signal and a predetermined value stored in the device or the variable. Timing when a value of the device or the variable changes to the predetermined value is start timing. As shown in FIG. 18, a change of the device or the variable being a rising edge or a falling edge may be set as a start condition. The same applies to the end signal. The CPU 41a (the collecting section 52c) executes data utilization program based on the application setting data (the collection setting 39) to thereby collect a collection target device value designated by the application setting data (the collection setting 39) and stores the device value in the second buffer 37b as collected data. The collected data may be time-series data collected at different times. A collection program for executing a collecting operation according to the collection setting 39 may be provided separately from the data utilization program. In this case, the collection setting is set according to the application setting data (the processing setting 61). A collection target device value designated by the set collection setting 39 is collected. The collected data may be stored in the second buffer 37b.

In S42, the CPU 41a (the data processing section 73) executes a data utilization program designated by the utilization program template (the processing setting 61). The CPU 41a (the data processing section 73) executes the data utilization program to determine, based on the collected data (device value), time information from timing when a condition of the start signal is satisfied to timing when a condition of the end signal is satisfied. The CPU 41a (the data processing section 73) monitors, according to a start condition 185c in FIG. 18, whether the device or the variable set as the monitoring target satisfies a condition such as a rising edge. Timing when the condition is satisfied, that is, timing when the condition of the start signal is satisfied is monitored. Similarly, the CPU 41a (the data processing section 73) monitors, according to an end condition 185d in FIG. 18, whether the device or the variable set as the monitoring target satisfies a condition such as a rising edge. Timing when the condition is satisfied, that is, timing when the condition of the end signal is satisfied is monitored. The time information determined by the CPU 41*a* (the data processing section 73) may be a time width from the timing when the condition of the start signal is satisfied to the timing when the condition of the end signal is satisfied.

In S43, the CPU 41*a* (the data processing section 73) determines a state based on the time information determined in S42 and determination thresholds set according to the application setting data (the processing setting 61). The CU 41*a* (the data processing section 73) executes the data utilization program to execute this determination. The upper limit values and the lower limit values of the attention value and the warning value are sometimes set as the determination thresholds. In this case, the CPU 41*a* (the data processing section 73) determines whether the determined time information, which is the measurement value, is larger than the upper limit value. The CPU 41*a* (the data processing section 73) determines whether the determined time information is smaller than the lower limit value. The application setting data (the processing setting 61) may include a flag indicating whether the upper limit values and the lower limit values are used as the determination thresholds. In this case, the CPU 41*a* (the data processing section 73) compares the upper limit values and the lower limit values, flags of which included in the application setting data (the processing setting 61) are checked, and the determined time information, which is the measurement value, to determine a state of the monitoring target. Values of the flags can be set by the user through a UI such as a checkbox. The state of the monitoring target may include normal, attention, and warning. The attention state and the warning state are distinguished based on a deviation degree of the measurement value with respect to the normal state. A difference between a measurement value (a normal value) in the normal state and a measurement value (a warning value) in the warning state is larger than a difference between a measurement value in the normal state and a measurement value (an attention value) in the attention state. Accordingly, a value further deviating from the normal value than the attention value is set as the warning value. The attention value and the waring value are sometimes respectively set as upper limit values. In this case, the CPU 41*a* (the data processing section 73) determines the state of the monitoring target as "normal" when the determined time information is equal to or smaller than the attention value. The CPU 41*a* (the data processing section 73) determines the state of the monitoring target as "attention" when the determined time information is larger than the attention value and is equal to or smaller than the warning value. The CPU 41*a* (the data processing section 73) determines the state of the monitoring target as "warning" when the determined time information is larger than the warning value. Consequently, the analyzed data is created and saved in the memory.

The attention value and the warning value are sometimes respectively set as the lower limit values. In this case, the CPU 41*a* (the data processing section 73) determines the state of the monitoring target as "normal" when the determined time information is equal to or larger than the attention value. The CPU 41*a* (the data processing section 73) determines the state of the monitoring target as "attention" when the determined time information is smaller than the attention value and is equal to or larger than the warning value. The CPU 41*a* (the data processing section 73) determines the state of the monitoring target as "warning" when the determined time information is smaller than the warning value. Consequently, analyzed data is created and saved in the memory.

The attention value and the warning value are sometimes respectively set by upper limit values and lower limit values. In this case, the CPU 41*a* (the data processing section 73) determines the state of the monitoring target as "normal" when the determined time information is equal to or larger than the lower limit attention value and equal to or smaller than the upper limit attention value. The CPU 41*a* (the data processing section 73) determines the state of the monitoring target as "attention" when the determined time information is smaller than the upper limit warning value and equal to or larger than the upper limit attention value. Similarly, the CPU 41*a* (the data processing section 73) determines the state of the monitoring target as "attention" when the determined time information is smaller than the lower limit attention value and equal to or larger than the lower limit warning value. The CPU 41*a* (the data processing section 73) determines the state of the monitoring target as "warning" when the determined time information is smaller than the lower limit warning value or larger than the upper limit warning value. Consequently, analyzed data is created and saved in the memory.

The CPU 41*a* (the data processing section 73) may calculate a margin degree indicating to which degree the measurement value has a margin with respect to the warning value or the attention value. For example, the margin degree may be defined as being 100 in a state with a sufficient margin, 50 in the attention state, and 0 in the warning state. In this way, the margin degree may be defined such that a value changes stepwise according to the distance (the difference) between the attention value and the measurement value. The margin degree is saved in the memory 42*a* as the analyzed data. When the measurement value exceeds the warning value, the CPU 41*a* (the data processing section 73) may generate a signal indicating that the measurement value exceeds the warning value. For example, when the measurement value exceeds the warning value, the CPU 41*a* (the data processing section 73) changes a value of a device or a variable indicating that the measurement value exceeds the warning value. The device or the variable indicating that the measurement value exceeds the warning value may be allocated as a trigger. For example, the device or the variable may be allocated to a logging saving trigger. Consequently, an operation record or the like of the PLC 1 is saved based on timing when warning is generated.

In S44, the CPU 41*a* (the generating section 74) generates source data of the dashboard 171 including the time information determined in S42, the determination thresholds, and the state of the monitoring target determined in S43. The CPU 41*a* (the generating section 74) reflects the time information determined based on the dashboard template (the display setting 62), the determination thresholds, and the determined state of the monitoring target on the variable allocated to the dashboard template (the display setting 62). For example, the CPU 41*a* (the generating section 74) creates display data such that a measurement value indicating a time width from timing when the condition of the start signal is satisfied to timing when the condition of the end signal is satisfied is displayed in a form of a bar graph in the graph display field 174*g* in FIG. 17. This time and a time period from the timing when the condition of the start signal is satisfied to the timing when the condition of the end signal is satisfied may be displayed in a belt shape. Consequently, a dashboard indicating not only the time width but also in which timing in a cycle the monitoring targets are operating in the control of the cycle operation is displayed. For example, a right end to a left end of the graph display field 174*g* may be equivalent to one cycle of the monitoring target. A start position of a belt (a bar of the bar graph) is equivalent to timing when the condition of the start signal in one cycle is satisfied. The end position of the belt is equivalent to timing when the condition of the end signal in one cycle is satisfied. Accordingly, the length of the belt indicates the time width.

The margin degree may be displayed together with the measurement value. The CPU 41*a* (the generating section 74) creates, based on a variable allocated to the dashboard template (the display setting 62), display data (for example, HTML data) for displaying the dashboard 171. The CPU 41*a* (the generating section 74) may separately manage screen data, on which the dashboard 171 is based, and data to be updated such as the measurement value and the state information. In this case, the CPU 41*a* (the generating section 74) individually manages screen data to which a device or a variable at a reference destination is allocated and display target data, which is a value of the device or the variable at the reference destination. The CPU 41*a* (the generating section 74) may periodically update the display target data to create the display data. The generating section 74 creates the display data using the display target data such as the collected data and/or the analyzed data.

In S45, the CPU 41*a* (the Web server 70) provides the display data to the PC 2*b*. The CPU 41*a* may display the display data on a display of the PLC 1. The display of the PLC 1 may be incorporated in the PLC 1 or may be connected to the PLC 1 by wire or radio. The CPU 41*a* (the generating section 74) sometimes separately manages the screen data to which the device or the variable at the reference destination is allocated and the display target data, which is the value of the device or the variable at the reference destination. In this case, the CPU 41*a* (the Web server 70) selectively provides the screen data and the display target data in the display data according to an update request and an update schedule for the dashboard 171. The CPU 41*a* (the Web server 70) provides the display data including the screen data and the display target data according to a display request for the dashboard 171. The CPU 41*a* (the Web server 70) selectively provides updated display target data as the display data according to the display update request for the dashboard 171.

In S51, the CPU 41*a* (the generating section 74) displays the dashboard 181 for setting. For example, the generating section 74 creates display data for displaying the dashboard 181 for setting shown in FIG. 18. The CPU 41*a* (the Web server 70) provides display data for displaying the dashboard 181 for setting to the PC 2*b*.

In S52, the CUP 41*a* (the setting section 71) receives a user input for addition, deletion, and change of the monitoring target and/or setting of the determination thresholds. When detecting that the addition button 186*a* is pressed, the CPU 41*a* (the setting section 71) adds an input row for setting a new monitoring target. The CPU 41*a* (the generating section 74) creates display data in order to display the dashboard 181 for setting to which the input row for setting the new monitoring target is added. The CPU 41*a* (the Web server 70) provides display data for displaying the updated dashboard 181 for setting to the PC 2*b*. When detecting that the deletion button 186*b* is pressed, the CPU 41*a* (the setting section 71) deletes a selected input row. The CPU 41*a* (the generating section 74) creates display data in order to display the dashboard 181 for setting in which the selected input row is deleted. The CPU 41*a* (the Web server 70) provides display data for displaying the updated dashboard 181 for setting to the PC 2*b*. In this case, selection operation on the input row by the up down button 186*c* may be displayed. When the CPU 41*a* (the setting section 71) receives a change input to the input fields 185*a* to 185*d*, the CPU 41*a* (the generating section 74) creates display data in order to display the dashboard 181 for setting on which change input to the input fields 185*a* to 185*d* is reflected. The CPU 41*a* (the Web server 70) provides display data for displaying the updated dashboard 181 for setting to the PC 2*b*. When the CPU 41*a* (the setting section 71) receives a change input for the determination thresholds to the input fields 185*e* and 185*f*, the CPU 41*a* (the generating section 74) creates display data in order to display the dashboard 181 for setting on which the change input for the determination thresholds to the input fields 185*e* and 185*f* are reflected. The CPU 41*a* (the Web server 70) provides the display data for displaying the updated dashboard 181 for setting to the PC 2*b*.

In S53, the CPU 41*a* (the setting section 71) updates, according to a user input, the application setting data (the processing setting 61) corresponding to the user input. When detecting that the setting reflection button 187 is pressed, the CPU 41*a* (the setting section 71) reflects updated setting content on the application setting data (the processing setting 61). On the other hand, when detecting that the cancel button 188 is pressed, the CPU 41*a* (the setting section 71) does not reflect the updated setting content on the application setting data (the processing setting 61) and discards the updated setting content. The CPU 41*a* (the generating section 74) creates display data in order to display the dashboard 171 for the real-time monitoring application based on the application setting data (the processing setting 61) without reflecting the updated setting content. The CPU 41*a* (the Web server 70) provides display data for displaying the dashboard 171 for the real-time monitoring application to the PC 2*b*.

In S54, the CPU 41*a* (the data processing section 73) determines a state of the monitoring target according to the application setting data (the processing setting 61) updated in S53 and based on the determined time information and the set determination thresholds concerning the monitoring target. The CPU 41*a* (the data processing section 73) determines the state of the monitoring target as in S43 according to the updated application setting data (the processing setting 61) and based on time information determined as in S42 and the determination thresholds set according to the updated application setting data (the processing setting 61).

In S55, the CPU 41*a* (the generating section 74) creates display data for displaying, on the dashboard for state monitoring shown in FIG. 18, the time information determined according to the updated application setting data (the processing setting 61), the determination thresholds set according to the updated application setting data (the processing setting 61), and the state of the monitoring target determined in S54. The CPU 41*a* (the Web server 70) provides display data for displaying the dashboard 171 for state monitoring to the PC 2*b*.

Figure 21:
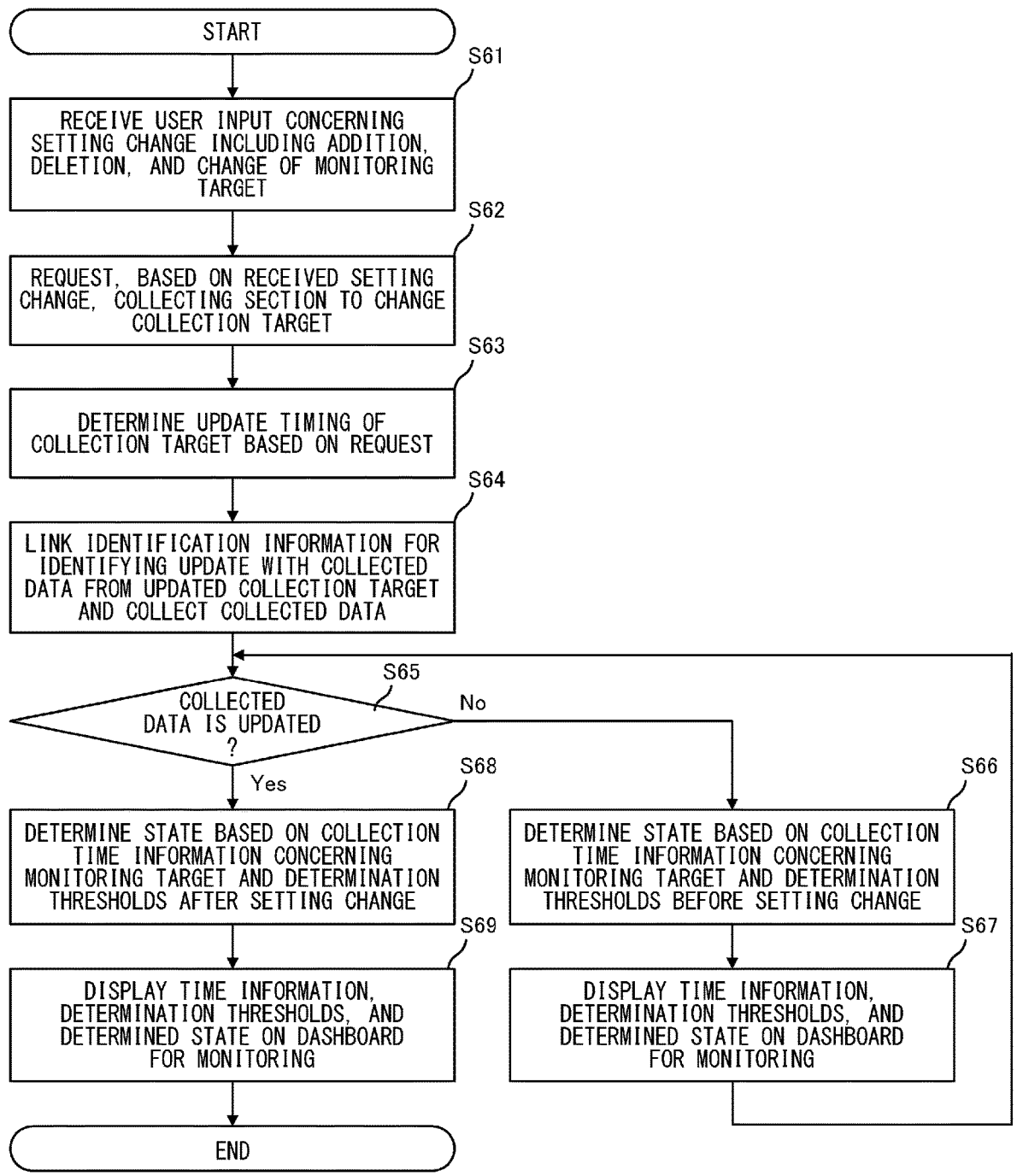
FIG. 21 is a flowchart showing dynamic change processing for a monitoring target.

FIG. 21 is a flowchart showing dynamic change processing for a monitoring target executed by the CPU 41*a* of the extension unit 4*a*. In FIG. 21, in S61, the CPU 41*a* (the setting section 71) receives a user input for setting change including addition, deletion, and change of the monitoring target. When detecting that the addition button 186*a* is pressed, the CPU 41*a* (the setting section 71) adds an input row for setting a new monitoring target. The CPU 41*a* (the generating section 74) creates display data in order to display the dashboard 181 for setting to which the input row for setting a new monitoring target is added. The CPU 41*a* (the Web server 70) provides the display data for displaying the updated dashboard 181 for setting to the PC 2*b*. When detecting that the deletion button 186*b* is pressed, the CPU 41*a* (the setting section 71) deletes a selected input row. The CPU 41*a* (the generating section 74) creates display data in order to display the dashboard 181 for setting in which the selected input row is deleted. The CPU 41*a* (the Web server 70) provides the display data for displaying the updated dashboard 181 for setting to the PC 2*b*.

In S62, the CPU 41*a* (the setting section 71) requests, based on the received setting change, the CPU 41*a* (the collecting section 52*c*) to change the collection target. In S63, the CPU 41*a* (the collecting section 52*c*) determines, based on the request in S62, timing for updating the collection target. A CPU 31*a* (the collecting section 52*a*) may determine, based on the request in S62 via the CPU 41*a* (the collecting section 52*c*), the timing for updating the collection target. The timing for updating the collection target may be a scan start time immediately after the change request for the collection target is received or at a cycle control start time immediately after the change request for the collection target is received. "Immediately after the change request for the collection target is received" may be determined considering a predetermined period from when the change request for the collection target is received until when a change of the collection target is actually executed.

In S64, the CPU 41*a* (the collecting section 52*c*) executes update of the collection target based on the update timing for the collection target determined in S63. The CPU 41*a* (the collecting section 52*c*) links collected data from the updated collection target with identification information and collects the collected data. The identification information is information for identifying that the collected data is updated and may be called update identification information. The CPU 41*a* (the collecting section 52*c*) further links time information at the time of collection of the collected data concerning the collected data, which is the monitoring target, with the collected data and the identification information and collects the time information. The time information may be called collection time information. The CPU 31*a* (the collecting section 52*a*) may link the collected data from the updated collection target with the update identification information and collect the collected data. The CPU 31*a* (the collecting section 52*a*) may further link the collection time information concerning the collected data, which is the monitoring target, with the collected data and the identification information and collect the collection time information. Note that the update of the collection target may be executed in parallel to the collecting operation without stopping the collecting operation.

Figure 19:
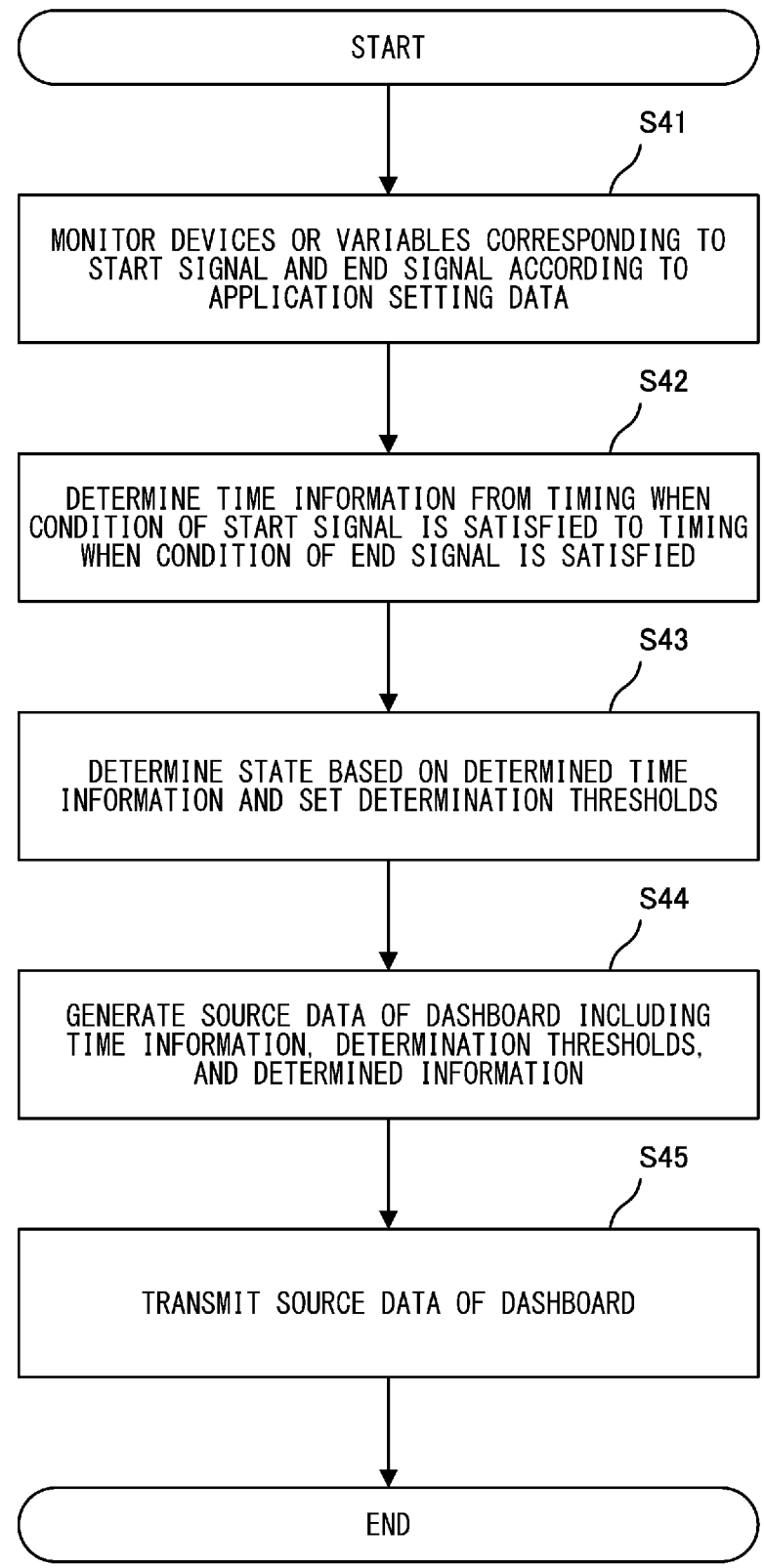
FIG. 19 is a flowchart showing a real-time monitoring method.
Figure 20:
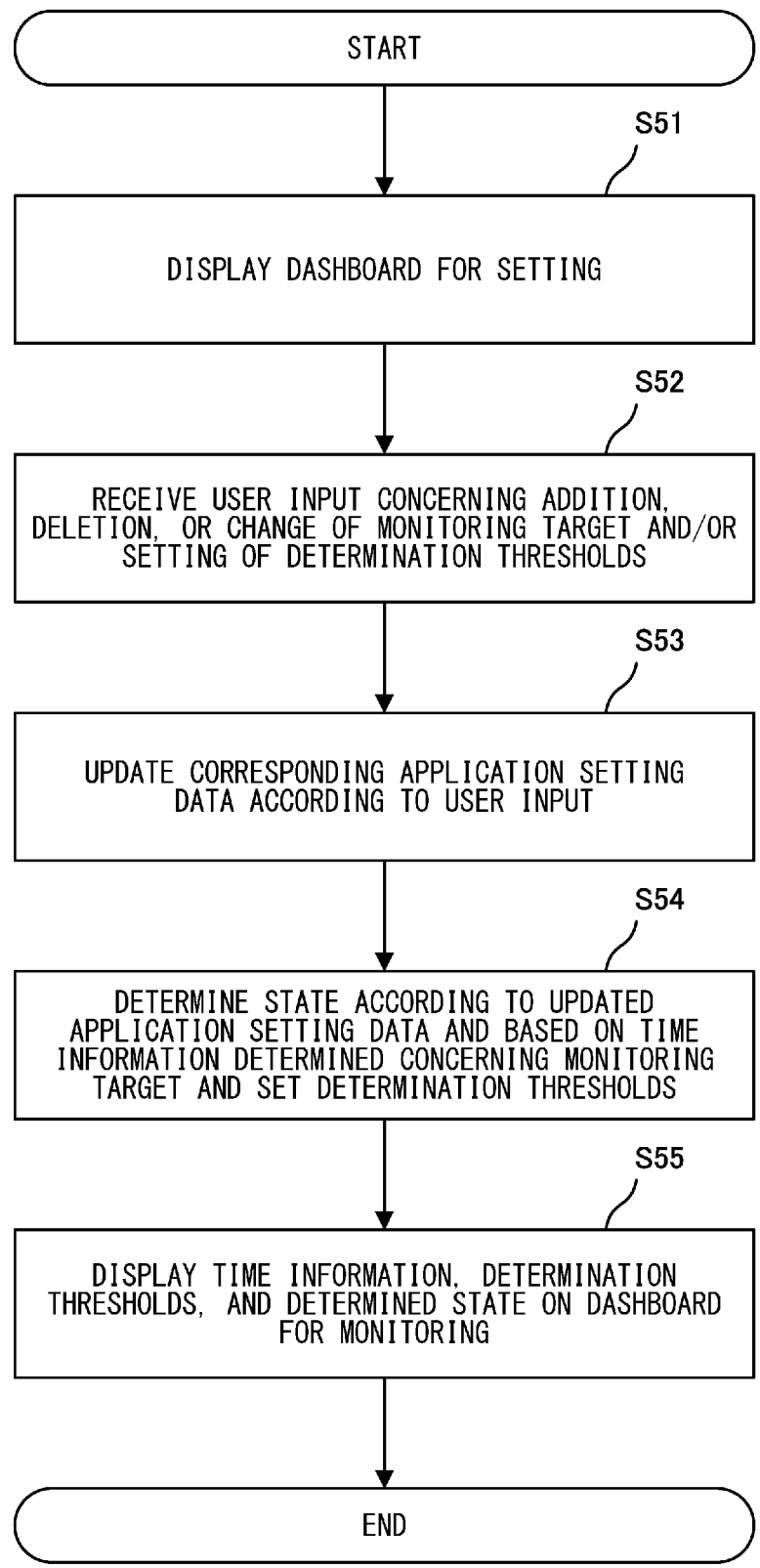
FIG. 20 is a flowchart showing a resetting method in a data utilization unit.

In S65, the CPU 41*a* (the data processing section 73) discriminates, based on the identification information, whether the collected data is updated. When a discrimination result about the update of the collected data indicates that the collected data is not updated, the CPU 41*a* (the data processing section 73) proceeds to S66. In S66, the CPU 41*a* (the data processing section 73) determines a state of the monitoring target based on the collection time information concerning the monitoring target and the determination thresholds before the setting change. The CPU 41*a* (the data processing section 73) determines, as in S42 in FIG. 19, based on the collected data, which is the monitoring target, time information from the timing when the condition of the start signal is satisfied to the timing when the condition of the end signal is satisfied and determines, as in S43, a state of the monitoring target based on the determined time information and the determination thresholds before the setting change. In S67, the CPU 41*a* (the generating section 74) creates display data for displaying, on the dashboard for state monitoring shown in FIG. 18, a measurement value, which is the determined time information, the determination thresholds, and the determined state of the monitoring target. The CPU 41*a* (the Web server 70) provides display data for displaying the dashboard 171 for state monitoring to the PC 2*b*. The CPU 41*a* (the generating section 74) may individually manage image data, which is a base of the dashboard 171, and data to be updated such as the measurement value and the state information. In this case, the CPU 41*a* (the generating section 74) generates display data including the measurement value, which is the determined time information, the determination thresholds, and the determined state of the monitoring target. In response to an update request, the CPU 41*a* (the Web server 70) provides, to the PC 2*b*, display data for displaying the dashboard 171 for state monitoring including the measurement value, the determination thresholds, and the determined state of the monitoring target. The CPU 41*a* (the Web server 70) selectively provides display target data updated as the display data to the PC 2*b*. Returning to S65 again, the CPU 41*a* (the data processing section 73) discriminates update of the collected data based on the identification information.

When the determination result about the update of the collected data indicates that the collected data is updated, the CPU 41*a* (the data processing section 73) proceeds to S68. In S68, the CPU 41*a* (the data processing section 73) determines a state of the monitoring target based on the collection time information concerning the monitoring target and the determination thresholds after the setting change. The CPU 41*a* (the data processing section 73) determines, as in S42 in FIG. 19, based on the collected data, which is the monitoring target, time information from the timing when the condition of the start signal is satisfied to the timing when the condition of the end signal is satisfied and determines, as in S43, a state of the monitoring target based on the measurement value, which is the determined time information, and the determination thresholds after the setting change. In S69, the CPU 41*a* (the generating section 74) creates display data for displaying, on the dashboard for state monitoring shown in FIG. 18, the measurement value, which is the determined time information, the determination thresholds, and the determined state of the monitoring target. The CPU 41*a* (the Web server 70) provides display data for displaying the dashboard 171 for state monitoring to the PC 2*b*. The CPU 41*a* (the generating section 74) may individually manage the screen data and the display target data. In this case, in S67, the CPU 41*a* (the generating section 74) generates display data including the measurement data, which is the determined time information, the determination thresholds, and the determined state of the monitoring target. In response to an update request, the CPU 41*a* (the Web server 70) provides, to the PC 2*b*, display data for displaying the dashboard 171 for state monitoring including the measurement value, which is the determined time information, the determination thresholds, and the determined state of the monitoring target. The CPU 41*a* (the Web server 70) selectively provides the display target data updated as the display data to the PC 2*b*.

FIG. 22 is a diagram showing collected data during a dynamic change of a monitoring target in the second buffer 37*b* (or the third buffer 37*c*) and a device value in the device section 34*a*. The CPU 41*a* (the setting section 71) requests, based on a received setting change, the collecting section 52*c* to change a collection target. The collecting section 52*c* determines, based on the request, timing for updating the collection target. The collecting section 52*c* updates the collection target in a period of a scan number 100 to a scan number 101 in FIG. 22. The monitoring targets are designated in the application setting data (the processing setting 61). Monitoring targets before the setting change are MR001 and MR002. Monitoring targets after the setting change are MR001, MR003, and MR004. A collection target of the application setting data (the collection setting 39) is defined based on the application setting data (the processing setting 61). Before the setting change, a collection target 1 is MR001, a collection target 2 is MR002, and a collection target 3 is not set. After the setting change, the collection target 1 remains MR001, the collection target 2 is changed from MR002 to MR003, and MR004 is added to the collection target 3 anew. The CPU 41a (the collecting section 52c) links, for each data record 91, in the second buffer 37b, a scan number, a timer value, an identification flag, and collected data corresponding to collection targets and records the scan number, the timer value, the identification flag, and the collected data. The CPU 41a (the collecting section 52c) collects collected data based on the determined update timing and gives identification information corresponding to the update timing as an identification flag. As the identification flag, for example, a count value of a ring counter counted in every update may be applied.

The CPU 41a (the data processing section 73) discriminates, based on the identification flag, whether the collected data recorded in the second buffer 37b is collected based on the application setting data (the processing setting 61) before the update or collected based on the application setting data (the processing setting 61) after the update. The identification flag is set in the collected data, which is the monitoring target, when the collection target is updated. Therefore, the data processing section 73 can distinguish the collected data before the update and the collected data after the update based on the identification flag. The data processing section 73 dynamically changes the application setting data (the processing setting 61) applied to the collected data, which is the monitoring target, based on the identification flag. Consequently, the PLC 1 can dynamically execute the update of the collection target without stopping the collecting operation.

Summary

Viewpoint 1

As shown in FIG. 5, the CPU 31 and the execution engine 51a are examples of a first execution engine that repeatedly executes a first user program. The device section 34a is an example of a plurality of holding means, which are devices or variables that store data accessed by the first execution engine according to the first user program. The CPU 41a is an example of a second execution engine that executes a second user program asynchronously with a scan period of the first user program. The extension bus 90 is an example of a bus that connects the first execution engine and the second execution engine.

The collecting section 52a functions as collecting means for collecting, for each scan period of the first user program, according to predetermined collection setting, data stored in a collection target holding means among the plurality of holding means. The first buffer 37a is an example of a first buffer that accumulates time-series data collected at every scan period by the collecting means. The transferring section 53a is an example of transferring means for transferring the time-series data stored in the first buffer to the second execution engine via an extension bus.

The data processing section 73 is an example of processing means for performing, according to predetermined processing setting, data processing of the time-series data transferred by the transferring means. The generating section 74 is an example of generating means for generating display data for displaying a processing result of the data processing on a dashboard. The Web server 70 functions as providing means for providing the display data to an external computer (for example, the PC 2b). By providing the first buffer 37a in this way, it is possible to efficiently collect and transfer monitoring target data in the PLC 1.

Viewpoint 2

The monitoring section 54a is an example of monitoring means for monitoring traffic of the extension bus 90. The transferring section 53a may transfer data to the second execution engine at timing when the traffic of the extension bus 90 is relatively small and suppress the transfer of time-series data to the second execution engine at timing when the traffic of the extension bus is relatively large. Consequently, execution of input and output refresh, a UREAD command, or a UWRIT command through the extension bus 90 is not hindered. Extension of a scan period would be suppressed.

Note that the monitoring section 54a may function as monitoring means for monitoring priority of information about to be transferred in the extension bus 90. In this case, the transferring section 53a transfers the time-series data to the second execution engine at timing when information having priority higher than priority of the time-series data is absent. The transferring section 53a suppresses transfer of the time-series data to the second execution engine at timing when information having priority higher than the priority of the time-series data is present. Note that high priority is allocated to information transferred by refresh and a bus communication request by a command word. On the other hand, low priority is allocated to the time-series data.

Viewpoint 3

The transferring section 53a may execute the transfer of the time-series data while avoiding a period in which the first execution engine is executing the input and output refresh using the extension bus 90. Consequently, the input and output refresh through the extension bus 90 is not hindered. Extension of the scan period would be suppressed.

Viewpoint 4

The compression engine 55a is an example of compressing means for compressing the time-series data stored in the first buffer 37a. This compression processing may be executed in parallel to the first execution engine executing the first user program. The transferring section 53a may transfer the time-series data compressed by the compressing means to the second execution engine. Consequently, the data transfer would be efficiently executed. In particular, in the extension bus 90, a probability of collision of other transfer processing such as the input and output refresh and the UREAD command and transfer processing for data utilization would decrease.

Viewpoint 5

The time-series data stored in the first buffer 37a may include a plurality of data records respectively acquired at each of different scan periods. As shown in FIG. 11, when two successive data records among the plurality of data records coincide, the compression engine 55a may discard one of the two data records to leave a data record at a change point of data among the plurality of data records. When temporally continuous three or more data records are common to one another, only one data record among the three or more data records is maintained as a transfer target.

Viewpoint 6

The second buffer 37b is an example of a second buffer that stores the time-series data transferred by the transferring means. The CPU 41a, which is the second execution engine, is configured to refer to the time-series data stored in the second buffer 37b. By preparing the second buffer 37b in this way, it is possible to asynchronously execute the storage of the data in the second buffer 37b and the data processing in the data processing section 73.

Viewpoint 7

The transferring sections 53a and 53b may be configured to acquire data from the holding means (for example, the device section 34b) of the extension unit 4b and transfer the data to the second execution engine. The third buffer 37c is an example of a third buffer that accumulates the data acquired from the holding means of the extension unit 4b. The second execution engine may be configured to read out the data from the third buffer 37c and execute data processing. Consequently, it is possible to asynchronously execute the storage of the data in the third buffer 37c and the data processing in the data processing section 73. Note that the transferring section 53b may write the data in the third buffer 37c through the transferring section 53a. When the transferring section 53a functions as a master and the transferring section 53b functions as a slave, such transfer processing may be realized.

Viewpoint 8

The fourth buffer 37d of the extension unit 4b functions as a fourth buffer that stores data acquired from the holding means of the extension unit 4b according to a predetermined control period different from the scan period. The transferring sections 53a and 53b may be configured to acquire the data of the holding means of the extension unit 4b from the fourth buffer 37d. Consequently, in the extension unit 4b, it is also possible to asynchronously execute the operation of the execution engine 51b and the transfer processing for the data.

Viewpoint 9

As explained concerning FIG. 11, the time-series data may include a first data record and a second data record respectively acquired at different timings. The second execution engine (for example, the CPU 41a) may calculate a time interval between timing when a bit of interest included in the first data record changes and timing when a bit of interest included in the second data record changes.

Viewpoint 10

As shown in FIG. 12, the time-series data may include first waveform data and second waveform data respectively acquired at different timings. As shown in FIG. 12, the second execution engine (for example, the CPU 41a) may match a phase of the first waveform data and a phase of the second waveform data with a reference phase. The generating section 74 may generate display data for displaying, on the dashboard, the first waveform data and the second waveform data matched with the reference phase. Consequently, the user would be able to visually observe differences in a waveform and a response characteristic.

Viewpoint 11

The data processing section 73 may be configured to execute a first data utilization application and a second data utilization application. The collecting section 52c may function as distributing means for distributing data for the first data utilization application among the time-series data stored in the second buffer 37b to the first sub-buffer 38a and distributing data for the second data utilization application among the time-series data stored in the second buffer 37b to the second sub-buffer 38b. Readout timing of the data for the first data utilization application and readout timing of the data for the second data utilization application are sometimes different. In such a case, by preparing a sub-buffer for each of the applications, a plurality of applications can acquire data at timings suitable for the applications. Operation efficiency of the applications would be improved.

Viewpoints 12 and 13

The transferring section 53a may be configured to subdivide and transfer the time-series data. In general, the time-series data tends to be large-capacity data. When a transfer request for other information having high priority is generated while the large-capacity time-series data is transferred, the transfer request for the other information having high priority is kept waited. Therefore, by subdividing the time-series data, the transfer request for the other information having high priority can be executed at intervals of the sub-divided time-series data. Accordingly, a waiting time of the transfer request for the other information having high priority would be reduced.

The transferring section 53a may be configured to transfer the time-series data in parallel to the first execution engine executing the first user program. Consequently, the time-series data would be more efficiently transferred.

What is claimed is:

1. A programmable logic controller comprising:
    a first execution engine configured to repeatedly execute a first user program;
    a plurality of holding sections, which are devices or variables configured to store data accessed by the first execution engine according to the first user program;
    a second execution engine configured to execute a second user program asynchronous with a scan period of the first user program;
    a bus configured to connect the first execution engine and the second execution engine;
    a collecting section configured to collect, at every scan period of the first user program, according to predetermined collection setting, data stored in a collection target holding section among the plurality of holding sections;
    a first buffer configured to accumulate time-series data collected at the every scan period by the collecting section; and
    a transferring section configured to transfer the time-series data stored in the first buffer to the second execution engine via the bus, wherein
    the second execution engine includes:
        a processing section configured to perform, according to predetermined processing setting, data processing of the time-series data transferred by the transferring section;
        a generating section configured to generate display data for displaying a processing result of the data processing on a dashboard; and
        a web server configured to provide the display data displaying the processing result of the data processing on the dashboard to a web browser accessing a web page of the dashboard on an external computer.

2. The programmable logic controller according to claim 1, further comprising a monitoring section configured to monitor priority of information about to be transferred in the bus, wherein
    the transferring section transfers the time-series data to the second execution engine at timing when information having priority higher than priority of the time-series data is absent and suppresses transfer of the time-series data to the second execution engine at timing when information having priority higher than the priority of the time-series data is present.

3. The programmable logic controller according to claim 2, wherein the transferring section executes the transfer of the time-series data while avoiding a period in which the first execution engine is executing the input and output refresh using the bus.

4. The programmable logic controller according to claim 1, further comprising a compressing section configured to compress the time-series data stored in the first buffer in parallel to the first execution engine executing the first user program, wherein
the transferring section transfers the time-series data compressed by the compressing section to the second execution engine.

5. The programmable logic controller according to claim 4, wherein
the time-series data stored in the first buffer includes a plurality of data records acquired at every scan period, and
when two successive data records among the plurality of data records coincide, the compressing section discards one of the two data records to leave a data record at a change point of data among the plurality of data records.

6. The programmable logic controller according to claim 1, further comprising a second buffer configured to store the time-series data transferred by the transferring section, wherein
the second execution engine is configured to refer to the time-series data stored in the second buffer.

7. The programmable logic controller according to claim 1, wherein
the transferring section is configured to acquire data from a holding section of an extension unit and transfer the data to the second execution engine,
the programmable logic controller further comprises a third buffer configured to accumulate the data acquired from the holding section of the extension unit, and
the second execution engine is configured to read out the data from the third buffer and execute the data processing.

8. The programmable logic controller according to claim 7, wherein
the extension unit includes a fourth buffer configured to store the data acquired from the holding section of the extension unit according to a predetermined control period different from the scan period, and
the transferring section is configured to acquire the data of the holding section of the extension unit from the fourth buffer.

9. The programmable logic controller according to claim 1, wherein
the time-series data includes a first data record and a second data record respectively acquired at different timings, and
the second execution engine calculates a time interval between timing when a bit of interest included in the first data record changes and timing when a bit of interest included in the second data record changes.

10. The programmable logic controller according to claim 1, wherein
the time-series data includes first waveform data and second waveform data respectively acquired at different timings,
the second execution engine matches a phase of the first waveform data and a phase of the second waveform data with a reference phase, and
the generating section generates display data for displaying, on the dashboard, the first waveform data and the second waveform data matched with the reference phase.

11. The programmable logic controller according to claim 6, wherein
the processing section is configured to execute a first data utilization application and a second data utilization application, and
the programmable logic controller further comprises:
a first sub-buffer;
a second sub-buffer; and
a distributing section configured to distribute data for the first data utilization application among the time-series data stored in the second buffer to the first sub-buffer and distribute data for the second data utilization application among the time-series data stored in the second buffer to the second sub-buffer.

12. The programmable logic controller according to claim 1, wherein the transferring section is configured to subdivide and transfer the time-series data.

13. The programmable logic controller according to claim 1, wherein the transferring section is configured to transfer the time-series data in parallel to the first execution engine executing the first user program.

14. A programmable logic controller comprising:
a basic unit; and
an extension unit connected to the basic unit, wherein
the basic unit includes:
an execution engine configured to repeatedly execute a user program;
a plurality of holding means, which are devices or variables configured to store data accessed by the execution engine according to the user program;
a collecting section configured to collect data stored in a collection target holding section among the plurality of holding sections according to predetermined collection setting at every scan period of the user program;
a first buffer configured to accumulate time-series data collected at the every scan period by the collecting section; and
a transferring section configured to transfer the time-series data stored in the first buffer to a data utilization unit, which is the extension unit connected via a bus, and
the data utilization unit includes:
a processing section configured to perform, according to predetermined processing setting, data processing of the time-series data transferred by the transferring section;
a generating section configured to generate display data for displaying a processing result of the data processing on a dashboard; and
a web server configured to provide the display data displaying the processing result of the data processing on the dashboard to a web browser accessing a web page of the dashboard on an external computer.

15. The programmable logic controller according to claim 14, further comprising a monitoring section configured to monitor priority of information about to be transferred in the bus, wherein
the transferring section transfers the time-series data to the second execution engine at timing when information having priority higher than priority of the time-series data is absent and suppresses transfer of the time-series data to the second execution engine at timing when information having priority higher than the priority of the time-series data is present.

16. The programmable logic controller according to claim 14, further comprising a compressing section configured to compress the time-series data stored in the first buffer in parallel to the first execution engine executing the first user program, wherein
the transferring section transfers the time-series data compressed by the compressing section to the second execution engine.

17. The programmable logic controller according to claim 16, wherein
the time-series data stored in the first buffer includes a plurality of data records acquired at every scan period, and
when two successive data records among the plurality of data records coincide, the compressing section discards one of the two data records to leave a data record at a change point of data among the plurality of data records.

18. The programmable logic controller according to claim 14, further comprising a second buffer configured to store the time-series data transferred by the transferring section, wherein
the second execution engine is configured to refer to the time-series data stored in the second buffer.

19. The programmable logic controller according to claim 18, wherein
the processing section is configured to execute a first data utilization application and a second data utilization application, and
the programmable logic controller further comprises:
a first sub-buffer;
a second sub-buffer; and
a distributing section configured to distribute data for the first data utilization application among the time-series data stored in the second buffer to the first sub-buffer and distribute data for the second data utilization application among the time-series data stored in the second buffer to the second sub-buffer.

20. The programmable logic controller according to claim 14, wherein the transferring section is configured to transfer the time-series data in parallel to the first execution engine executing the first user program.

* * * * *